(12) United States Patent
Wang et al.

(10) Patent No.: US 11,219,835 B2
(45) Date of Patent: Jan. 11, 2022

(54) CONTROL METHOD AND DEVICE BASED ON TOUCH SCREEN, MOBILE TERMINAL AND READABLE STORAGE MEDIUM

(71) Applicant: Tencent Technology (Shenzhen) Company Limited, Shenzhen (CN)

(72) Inventors: Yiran Wang, Shenzhen (CN); Bo Dong, Shenzhen (CN); Yulin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 73 days.

(21) Appl. No.: 16/780,760

(22) Filed: Feb. 3, 2020

(65) Prior Publication Data

US 2020/0174618 A1 Jun. 4, 2020

Related U.S. Application Data

(63) Continuation of application No. PCT/CN2018/097219, filed on Jul. 26, 2018.

(30) Foreign Application Priority Data

Aug. 8, 2017 (CN) .......................... 201710670070.1

(51) Int. Cl.
*A63F 13/822* (2014.01)
*G06F 3/041* (2006.01)
*A63F 13/2145* (2014.01)

(52) U.S. Cl.
CPC .......... *A63F 13/822* (2014.09); *G06F 3/0416* (2013.01); *A63F 13/2145* (2014.09);
(Continued)

(58) Field of Classification Search
CPC .... G06F 3/048; G06F 3/04817; G06F 3/0484; G06F 3/0488; G06F 3/0416; G06F 2203/04105; A63F 13/218; A63F 13/2145
See application file for complete search history.

(56) References Cited

U.S. PATENT DOCUMENTS

| | | | |
|---|---|---|---|
| 2011/0018695 A1* | 1/2011 | Bells .................. | G06F 3/016 340/407.2 |
| 2013/0002581 A1* | 1/2013 | Abe .................... | G06F 3/0488 345/173 |

(Continued)

FOREIGN PATENT DOCUMENTS

| | | |
|---|---|---|
| CN | 105426074 A | 3/2016 |
| CN | 106648381 A | 5/2017 |
| CN | 107479749 A | 12/2017 |

OTHER PUBLICATIONS

Tencent Technology, ISRWO, PCT/CN2018/097219, dated Sep. 28, 2018, 7 pgs.

(Continued)

*Primary Examiner* — Priyank J Shah
(74) *Attorney, Agent, or Firm* — Morgan, Lewis & Bockius LLP

(57) ABSTRACT

The present application discloses a touchscreen-based control method performed at a mobile terminal. The method includes: detecting a touch operation on a touch button on a touchscreen of the mobile terminal; determining a to-be-performed operation corresponding to the touch button on a touchscreen of the mobile terminal in response to the touch operation on the touch button; determining a current touch location and a current touch strength of the touch operation; and canceling the to-be-performed operation in a case that a current touch location of the touch operation is inside a control cancellation area displayed on the touchscreen and current touch strength of the touch operation is greater than (Continued)

or equal to a preset threshold. Compared with the related art, a current touch location and current touch strength of a touch operation are combined to determine whether to cancel a to-be-performed operation corresponding to a touch button.

17 Claims, 15 Drawing Sheets

(52) U.S. Cl.
CPC ............... *A63F 2300/1075* (2013.01); *G06F 2203/04105* (2013.01)

(56) References Cited

U.S. PATENT DOCUMENTS

| | | | | |
|---|---|---|---|---|
| 2013/0077804 A1* | 3/2013 | Glebe | .................. | G06F 3/0488 381/109 |
| 2017/0340959 A1* | 11/2017 | Tang | ..................... | A63F 13/822 |
| 2018/0373406 A1* | 12/2018 | Yan | ....................... | G06F 3/0488 |

OTHER PUBLICATIONS

Tencent Technology, IPRP, PCT/CN2018/097219, dated Feb. 11, 2020, 6 pgs.

* cited by examiner

CONTROL METHOD AND DEVICE BASED ON TOUCH SCREEN, MOBILE TERMINAL AND READABLE STORAGE MEDIUM

CROSS-REFERENCE TO RELATED APPLICATIONS

This application is a continuation application of PCT/CN2018/097219, entitled "TOUCHSCREEN-BASED CONTROL METHOD AND APPARATUS, MOBILE TERMINAL, AND READABLE STORAGE MEDIUM" filed on Jul. 26, 2018, which claims priority to Chinese Patent Application No. 2017106700701, entitled "TOUCHSCREEN-BASED CONTROL METHOD AND APPARATUS, MOBILE TERMINAL, AND READABLE STORAGE MEDIUM" filed on Aug. 8, 2017, both of which are incorporated by reference in their entirety.

FIELD OF THE TECHNOLOGY

The present application relates to the field of mobile terminal control technologies, and in particular, to a touchscreen-based control method and apparatus, a mobile terminal, and a readable storage medium.

BACKGROUND OF THE DISCLOSURE

In multiplayer online battle arena (MOBA) games, a user needs to control a game character to cast a spell. In a mobile MOBA game, a spell is cast mainly by tapping a specified spell cast button or holding and dragging a spell cast button to a specified position.

The need to cancel spell casting is inevitable during a game. However, in common methods for canceling spell casting, normal spell casting is prone to accidental cancellation, resulting in a high misoperation rate.

SUMMARY

A main objective of the present application is to provide a touchscreen-based control method and apparatus, a mobile terminal, and a readable storage medium, to resolve a technical problem that normal spell casting is prone to accidental cancellation and a misoperation rate is high in the related art.

To achieve the foregoing objective, a first aspect of the present application provides a touchscreen-based control method performed at a mobile terminal having one or more processors and memory storing a plurality of programs to be executed by the one or more processors, including:

detecting, by the mobile terminal, a touch operation on a touch button on a touchscreen of the mobile terminal;

determining, by the mobile terminal, a to-be-performed operation corresponding to the touch button on the touchscreen of the mobile terminal in response to the touch operation on the touch button;

determining a current touch location and a current touch strength of the touch operation; and canceling, by the mobile terminal, the to-be-performed operation in accordance with a determination that the current touch location of the touch operation is inside a control cancellation area displayed on the touchscreen and the current touch strength of the touch operation is greater than or equal to a preset threshold.

To achieve the foregoing objective, a second aspect of the present application provides a mobile terminal comprising one or more processors, memory coupled to the one or more processors and a plurality of programs stored in the memory that, when executed by the one or more processors, cause the mobile terminal to perform the aforementioned touchscreen-based control method according to the first aspect of the present application.

To achieve the foregoing objective, a third aspect of the present application provides a non-transitory computer readable storage medium storing a plurality of machine readable instructions in connection with a mobile terminal having one or more processors, wherein the plurality of machine readable instructions, when executed by the one or more processors, cause the mobile terminal to perform the aforementioned touchscreen-based control method according to the first aspect of the present application.

The present application provides a touchscreen-based control method. The method includes: determining, by the mobile terminal, a to-be-performed operation corresponding to a touch button on a touchscreen in response to a touch operation on the touch button; and canceling, by the mobile terminal, the to-be-performed operation in a case that a current touch location of the touch operation is inside a control cancellation area displayed on the touchscreen and current touch strength of the touch operation is greater than or equal to a preset threshold. Compared with the related art, a current touch location and current touch strength of a touch operation are combined to determine whether to cancel a to-be-performed operation corresponding to a touch button, so that the accuracy of determining whether to cancel a to-be-performed operation can be effectively improved and the misoperation rate can be reduced.

BRIEF DESCRIPTION OF THE DRAWINGS

To describe the technical solutions in the embodiments of the present application or the related art more clearly, the following briefly describes the accompanying drawings required for describing the embodiments or the related art. Apparently, the accompanying drawings in the following descriptions show merely some embodiments of the present application, and a person skilled in the art may still derive other drawings from these accompanying drawings without creative efforts.

DESCRIPTION OF EMBODIMENTS

To make the objectives, features, and advantages of the present application clearer and more comprehensible, the following clearly and completely describes the technical solutions in the embodiments of the present application with reference to the accompanying drawings in the embodiments of the present application. Apparently, the embodiments described are merely a part rather than all of the embodiments of the present application. All other embodiments obtained by a person skilled in the art based on the embodiments of the present application without creative efforts shall fall within the protection scope of the present application.

Figure 1:
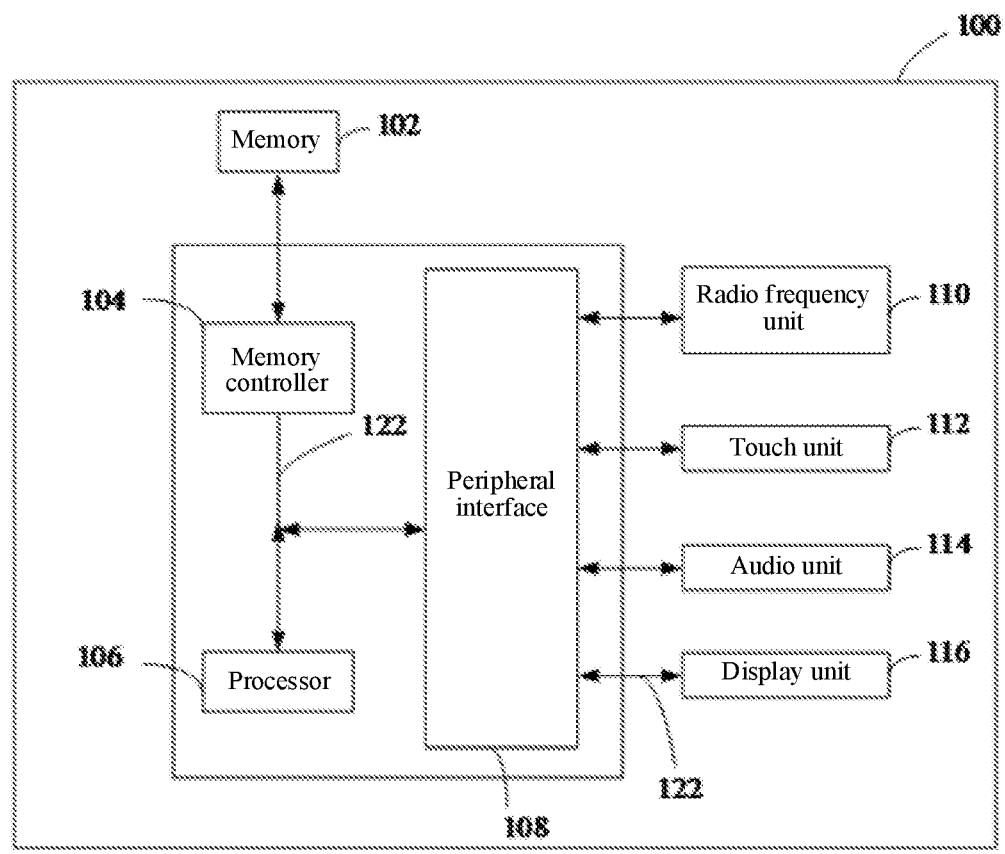
FIG. 1 is a structural block diagram of a mobile terminal.

Referring to FIG. 1, FIG. 1 is a schematic structural diagram of a mobile terminal 100. A touchscreen-based control method provided in an embodiment of the present application may be applied to the mobile terminal 100 shown in FIG. 1. The mobile terminal 100 may include, but is not limited to, a smartphone and a tablet computer that rely on batteries for normal operation and support Internet access and downloading.

As shown in FIG. 1, the mobile terminal 100 includes a memory 102, a memory controller 104, one or more processors 106 (only one processor is shown in the figure), a peripheral interface 108, a radio frequency (RF) unit 110, a touch unit 112, an audio unit 114, and a display unit 116. These components communicate with each other through one or more communication buses/signal cables 122.

It may be understood that the structure shown in FIG. 1 is merely exemplary and does not constitute any limitation to the structure of the mobile terminal 100. For example, the terminal 100 may alternatively include more or fewer components than those shown in FIG. 1, or have a configuration different from that shown in FIG. 1. The components shown in FIG. 1 may be implemented by using hardware, software or a combination thereof.

The memory 102 may be configured to store a computer program, for example, a program instruction or module corresponding to the touchscreen-based control method in an embodiment of the present application. The processor 106 executes the computer program stored in the memory 102 to implement the steps of the touchscreen-based control methods shown in FIG. 2 and FIG. 4.

The memory 102 is a computer-readable storage medium, which may include a high-speed random memory and may also include a nonvolatile memory such as one or more magnetic storage apparatuses, a flash memory, or another nonvolatile solid-state memory. In some examples, the memory 102 may further include memories remotely disposed relative to the processor 106, and these remote memories may be connected to the mobile terminal 100 through a network. Examples of the network include, but are not limited to, the Internet, an intranet, a local area network, a mobile communications network, and a combination thereof. The processor 106 and other possible components may access the memory 102 under the control of the memory controller 104.

The peripheral interface 108 couples various input/output devices to the processor 106 and the memory 102. The processor 106 runs different software and instructions in the memory 102, so as to perform different functions of the mobile terminal 100 and perform data processing.

In some examples, the peripheral interface 108, the processor 106, and the memory controller 104 may be implemented in a single chip. In some other embodiments, they may be separately implemented by independent chips.

The RF unit 110 is configured to receive and transmit an electromagnetic wave and implement mutual conversion between the electromagnetic wave and an electric signal, so as to communicate with a communications network or another device. The RF unit 110 may include various existing circuit elements for performing these functions, such as an antenna, an RF transceiver, a digital signal processor, a cipher/decipher chip, a subscriber identity module (SIM) card, and a memory. The RF unit 110 may communicate with various networks such as the Internet, an intranet and a wireless network of a preset type, or communicate with other devices through a wireless network of a preset type.

The touch unit 112 provides an interface for the user to input information to the mobile terminal 100, and the user may perform a touch operation on a touchscreen to enable the mobile terminal 100 to perform different functions.

The audio unit 114 provides an audio interface to a user, and may include one or more microphones, one or more loudspeakers, and an audio circuit. The audio circuit receives audio data from the peripheral interface 108, converts the audio data into electric information, and transmits the electric information to the loudspeaker. The loudspeaker converts the electric information into an acoustic wave audible to the human ear. The audio circuit further receives electric information from the microphone, converts the electric information into audio data, and transmits the audio data to the peripheral interface 108 for further processing. The audio data may be acquired from the memory 102 or by the RF unit 110. In addition, the audio data may also be stored in the memory 102 or transmitted by the RF unit 110. In some examples, the audio unit 114 may further include a headset jack, for providing an audio interface to a headset or another device.

The display unit 116 provides an output interface between the mobile terminal 100 and the user. Optionally, the display unit 116 displays a video output to the user, and content of the video output may include texts, graphics, videos, or any combination thereof. Some output results correspond to some user interface objects.

The touchscreen-based control method according to an embodiment of the present application is described based on the foregoing mobile terminal.

Because normal spell casting is prone to accidental cancellation in the related art, there is a technical problem of a high misoperation rate.

To resolve the foregoing problem, the present application provides a touchscreen-based control method, in which a current touch location and current touch strength of a touch operation are combined to determine whether to cancel a to-be-performed operation corresponding to a touch button, so that the accuracy of determining whether to cancel a to-be-performed operation can be effectively improved and the misoperation rate can be reduced.

Figure 2:
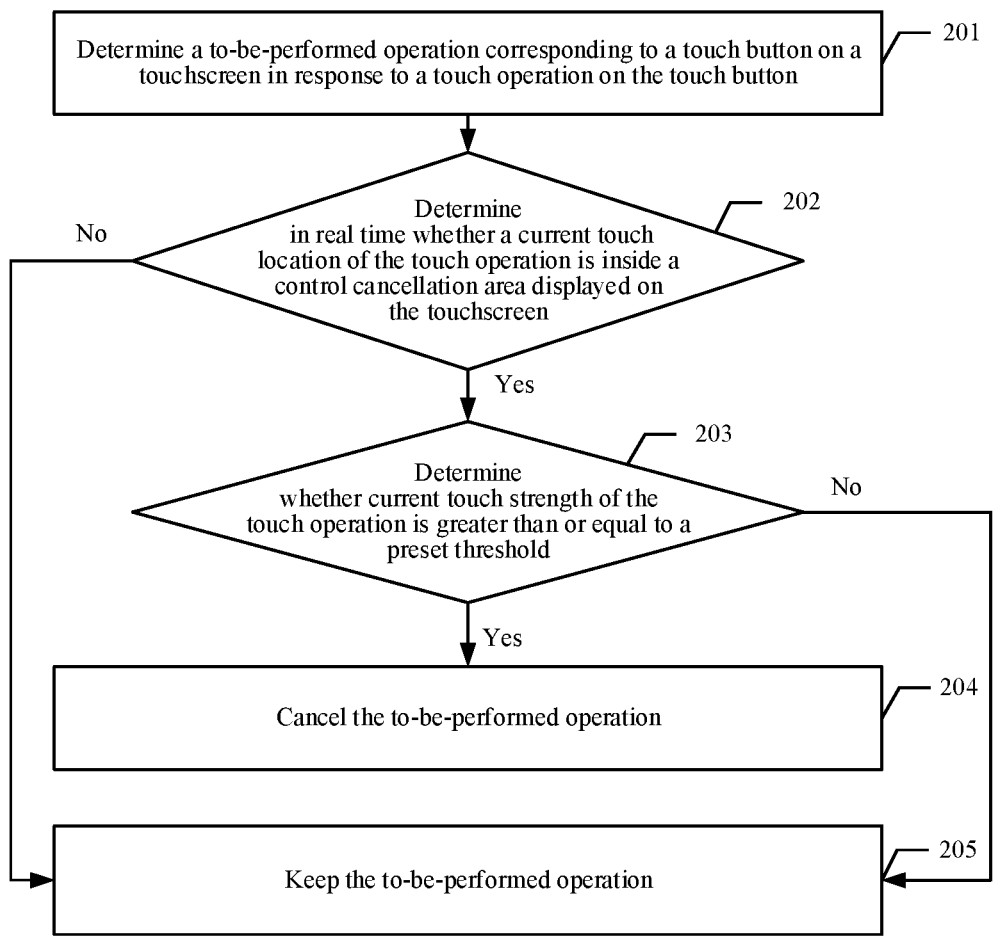
FIG. 2 is a schematic flowchart of a touchscreen-based control method according to an embodiment of the present application.

FIG. 2 is a schematic flowchart of a touchscreen-based control method according to an embodiment of the present application. The method includes the following steps:

S201. A mobile terminal determines a to-be-performed operation corresponding to a touch button on a touchscreen in response to a touch operation on the touch button.

Figure 3:
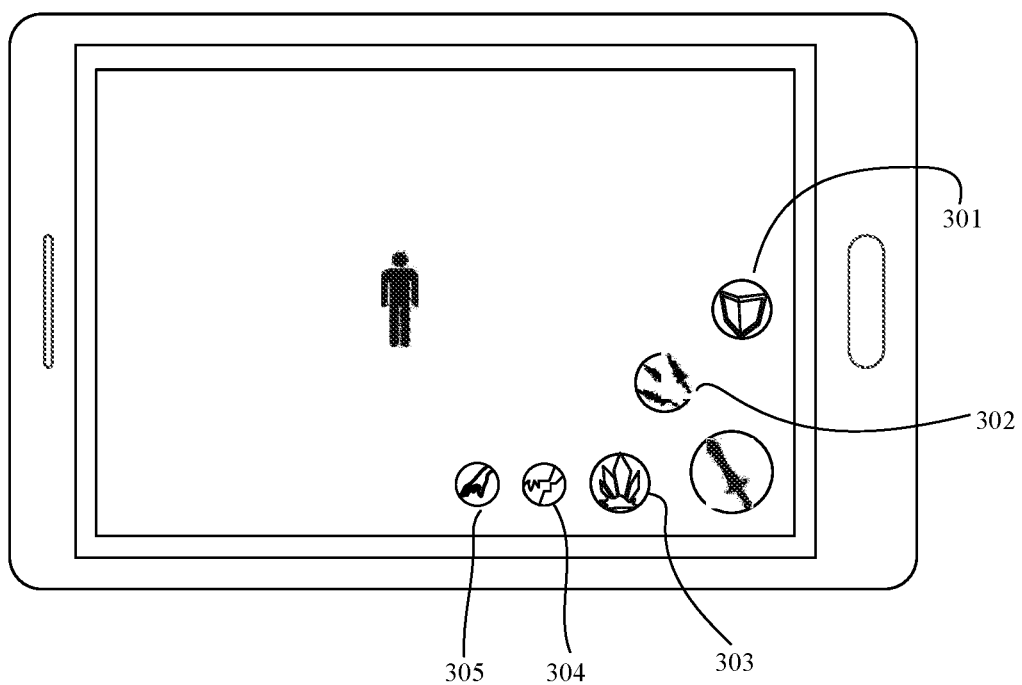
FIG. 3 is a schematic diagram of touch buttons on a touchscreen according to an embodiment of the present application.

In the embodiment of the present application, different touch buttons may be displayed on a display interface of the mobile terminal. A touch button is configured to intuitively display an operation that can be implemented by the button, and each touch button corresponds to one operation. The shape, size, and location of a touch button may be set according to a specific requirement. Different touch buttons can be distinguished by at least one or a combination of texts, symbols or patterns in the touch button or colors of the touch button. FIG. 3 is a schematic diagram of touch buttons on a touchscreen. The touchscreen of the mobile terminal displays touch buttons 301, 302, 303, and 304, and each touch button corresponds to a specific operation.

After the mobile terminal displays the touch buttons, a user may use a finger, another part of the body or a stylus to touch the touchscreen of the mobile terminal to perform a touch operation, so that the user selects a touch button through the touch operation. The mobile terminal determines the to-be-performed operation corresponding to the touch button in response to the touch operation on the touch button on the touchscreen. Unless otherwise specified, the touch button in subsequent descriptions is the touch button initially selected by the user when performing the touch operation.

The touch operation is an operation that remains in contact with the touch screen. It indicates that the touch operation is released and the touch operation ends in a case that the touch operation is no longer in contact with the touchscreen. Optionally, the user may further perform a press operation when performing the touch operation, that is, increase the touch strength applied to the touchscreen while remaining in contact with the touchscreen.

S202. The mobile terminal determines in real time whether a current touch location of the touch operation is inside a control cancellation area displayed on the touchscreen.

In a case that the current touch location of the touch operation is inside the control cancellation area, S203 is performed. In a case that the current touch location of the touch operation is not inside the control cancellation area, S205 is performed.

S203. The mobile terminal determines whether current touch strength of the touch operation is greater than or equal to a preset threshold.

In a case that the current touch strength of the touch operation is greater than or equal to the preset threshold, S204 is performed. In a case that the current touch strength of the touch operation is less than the preset threshold, S205 is performed.

S204. The mobile terminal cancels the to-be-performed operation.

S205. The mobile terminal keeps the to-be-performed operation.

In this embodiment of the present application, the control cancellation area is displayed on the touchscreen of the mobile terminal. The control cancellation area is configured for canceling the to-be-performed operation. Optionally, if the to-be-performed operation needs to be canceled, the user needs to move the finger or the stylus performing the touch operation and increases the touch strength generated by the touch operation to enable the touch location of the touch operation to be inside the control cancellation area. The touch strength of the touch operation is greater than or equal to the preset threshold. The value of the preset threshold may be set according to a specific case. The preset threshold usually can effectively distinguish a pressure value generated by a normal touch from a pressure value generated by pressing.

In a process of keeping in contact with the touchscreen during the touch operation, the mobile terminal monitors the current touch location of the touch operation in real time and determines whether the current touch location of the touch operation is inside the control cancellation area. In a case that the current touch location of the touch operation is inside the control cancellation area, the mobile terminal further determines whether the current touch strength at the current touch location of the touch operation is greater than or equal to the preset threshold to determine to whether to cancel the to-be-performed operation. A pressure sensor is disposed inside the touchscreen of the mobile terminal. The pressure sensor can detect the touch strength applied at the current touch location of the touch operation when the user performs the touch operation.

When the current touch strength of the touch operation is greater than or equal to the preset threshold, it indicates that the user increases the applied strength when performing the touch operation, and the mobile terminal will trigger a cancellation function, that is, cancel the to-be-performed operation. The current touch strength and the current touch location of the touch operation are touch strength and a touch location at the same time that are detected in real time.

In a case that the current touch location of the touch operation is not inside the control cancellation area, the mobile terminal does not need to further determine whether the current touch strength of the touch operation is greater than or equal to the preset threshold but instead keeps the to-be-performed operation. In addition, in a case that the current touch location of the touch operation is inside the control cancellation area, in a case that the current touch strength of the touch operation is less than the preset threshold, the to-be-performed operation is not canceled.

In this embodiment, in a case that the current touch location of the touch operation is inside the control cancellation area, the mobile terminal further determines whether the current touch strength of the touch operation is greater than or equal to the preset threshold, so that the current touch strength and the current touch location of the touch operation can be combined to determine whether to cancel the to-be-performed operation, thereby effectively improving the accuracy of determining whether to cancel a to-be-performed operation and reducing a probability of canceling a to-be-performed operation by mistake, that is, reducing the misoperation rate.

In the embodiment shown in FIG. 2, the mobile terminal first determines whether the current touch location of the touch operation is inside the control cancellation area. In a case that the current touch location of the touch operation is inside the control cancellation area, the mobile terminal further determines whether the current touch strength of the touch operation is greater than or equal to the preset threshold. In another feasible embodiment, alternatively, the mobile terminal may first determine whether the current touch strength of the touch operation is greater than or equal to the preset threshold. In a case that the current touch strength of the touch operation is greater than or equal to the preset threshold, the mobile terminal further determines whether the current touch location of the touch operation is inside the control cancellation area. Alternatively, in another feasible embodiment, the mobile terminal may simultaneously determine whether the current touch strength of the touch operation is greater than or equal to the preset threshold and whether the current touch location is inside the control cancellation area. That is, in the embodiment of the present application, a sequence of determining the current touch location and the current touch strength of the touch operation is not limited. The technical solution in the embodiment shown in FIG. 2 is only a feasible embodiment, and the present application is not limited thereto.

Figure 4:
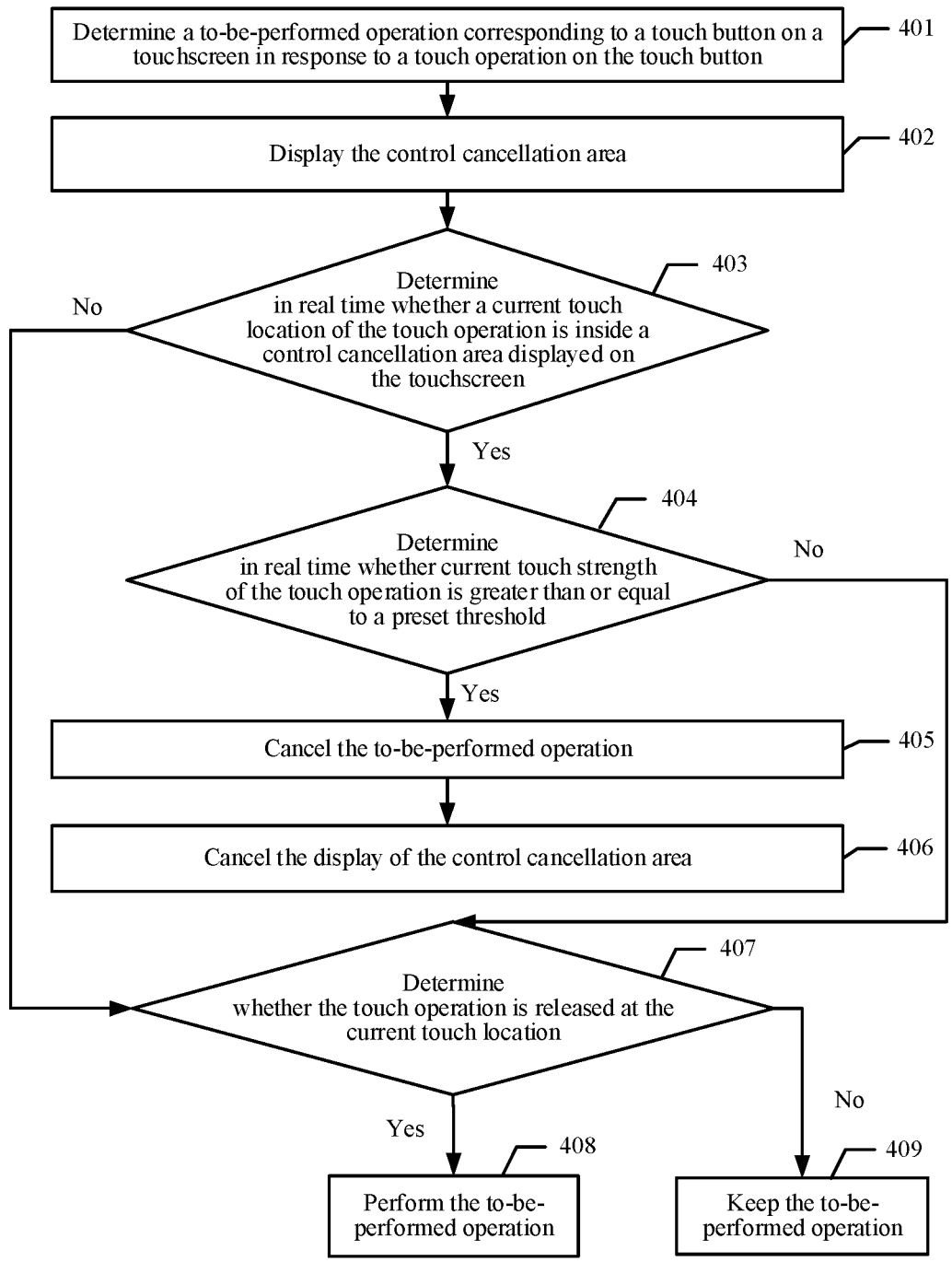
FIG. 4 is a schematic flowchart of a touchscreen-based control method according to an embodiment of the present application.

FIG. 4 is a schematic flowchart of a touchscreen-based control method according to an embodiment of the present application. The method includes the following steps:

S401. A mobile terminal determines a to-be-performed operation corresponding to a touch button on a touchscreen in response to a touch operation on the touch button.

S401 is similar to the content described in S201 in the embodiment shown in FIG. 2. Details are not described herein again.

S402. The mobile terminal displays the control cancellation area.

In the embodiment of the present application, the control cancellation area may be displayed when the user performs the touch operation on the touch button displayed on the touchscreen, and the control cancellation area is displayed at a specified location preset by the mobile terminal.

The control cancellation area may be an area defined by a regular polygon, for example, a circle, a rectangle or a hexagon. Alternatively, the control cancellation area is an area formed by splicing a plurality of specified geometric shapes, for example, a hexagon formed by a plurality of isosceles triangles.

Optionally, to facilitate the operation of the user, the mobile terminal may also display a text label inside the control cancellation area. The text label indicates the function of the control cancellation area to the user. For example, "Press hard to cancel" may be displayed inside the control cancellation area to prompt the user to keep the touch operation after selecting the control button through the touch operation, move the touch location of the touch operation into the control cancellation area, and cancel the to-be-performed operation by pressing.

In the embodiment of the present application, when the user performs the touch operation on the touch button, the touchscreen of the mobile terminal also displays an auxiliary control area and a candidate effect range area. The area of the candidate effect range area is greater than that of the auxiliary control area, and there is a location mapping relationship between the auxiliary control area and the candidate effect range area.

The auxiliary control area is an area in which the user performs an operation, and the candidate effect range area is an optional area used for determining an effect range of the to-be-performed operation.

The location of the candidate effect range area may be determined according to the location of a current virtual character object of the user. The current virtual character object of the user is a virtual character object controlled by the user using the mobile terminal. Optionally, the mobile terminal may display the candidate effect range area with the location of the current virtual character object of the user being the center.

After the user selects the touch button by using the touch operation, the mobile terminal displays the auxiliary control area with the touch button being the center. The user may keep the touch operation in contact with the touchscreen in the auxiliary control area, and simultaneously change the touch location of the touch operation, so that the mobile terminal determines an operation execution area of the to-be-performed operation corresponding to the touch button in the candidate effect range area based on the current touch location of the touch operation and the location mapping relationship. In a manner of setting the auxiliary control area and the candidate effect range area, the user performs the touch operation in a relatively small auxiliary control area without needing to move and operate significantly within the range of the touchscreen. To clearly know about the current touch location of the touch operation in the auxiliary control area, a touch location area may also be displayed. The touch location area is used for identifying the current touch location of the touch operation. Generally, the touch location area may be a small circular area.

Figure 5A:
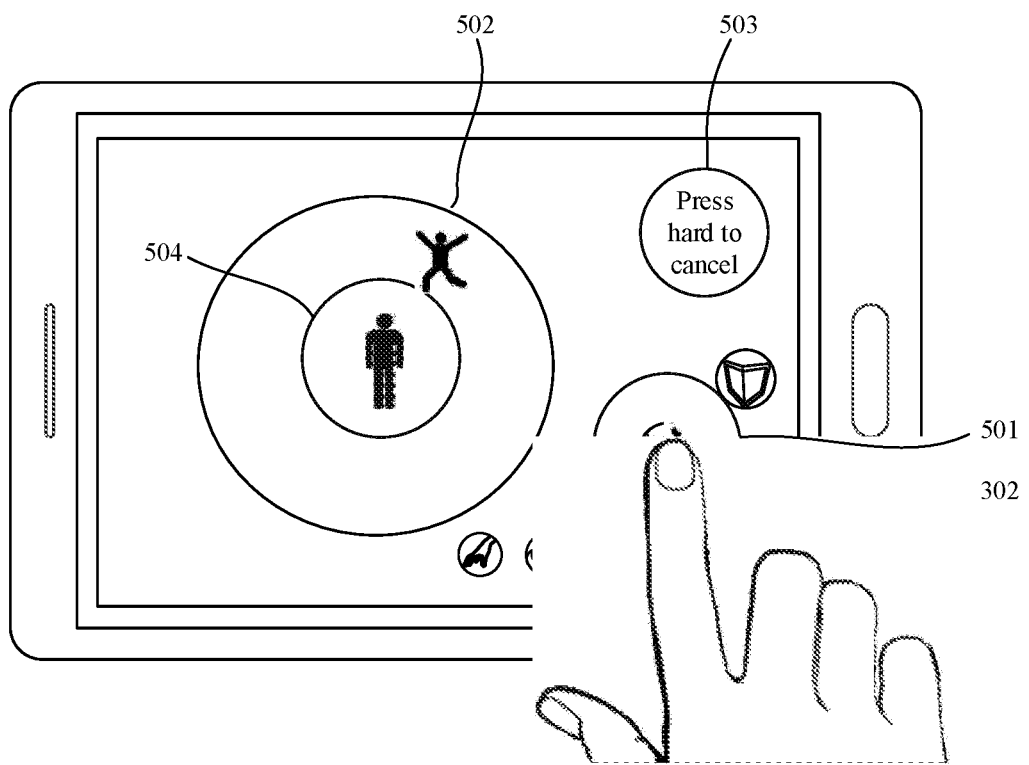
FIG. 5a to FIG. 5h are schematic diagrams of a display interface of a touchscreen according to an embodiment of the present application.

Based on the foregoing descriptions, after the user performs the touch operation on the touch button on the touchscreen, the touchscreen of the mobile terminal not only displays the control cancellation area, but also displays the auxiliary control area, the candidate effect range area, and the touch location area. The control cancellation area, the auxiliary control area, and the candidate effect range area are independent of each other and do not intersect with each other. FIG. 5a is a schematic diagram of a display interface of a touchscreen when a touch operation is performed. A user places a finger on a touch button 302 in the display interface. The finger is in contact with the touch button 302 to indicate that the touch button 302 is selected. The display interface displays an auxiliary control area 501, a candidate effect range area 502, and a control cancellation area 503, and displays an operation execution area 504 in the candidate effect range area 502 based on a current touch location of the touch operation.

The virtual character object controlled by the user includes a player-controlled character being a virtual target. The virtual target is a digital operable object. Virtual targets also include a non-player character (NPC). In a MOBA game, a player-controlled character may be called a hero. Every hero has a name and spells with various effects. A player-controlled character has a growth feature and changes as a game progresses. An NPC is a game character automatically controlled in a MOBA game. An NPC usually has various constant game attributes or a relatively weak growth feature. An NPC may be a mounted solider, an infantryman, an archer, a mage, an arrow tower, a turret, a magic tower, a catapult, a mortar, a beast soldier, or the like.

S403. The mobile terminal determines in real time whether a current touch location of the touch operation is inside the control cancellation area.

In a case that the current touch location of the touch operation is inside the control cancellation area, the mobile terminal performs S404. In a case that the current touch location of the touch operation is not inside the control cancellation area, the mobile terminal performs S407.

S404. The mobile terminal determines whether current touch strength of the touch operation is greater than or equal to a preset threshold.

In a case that the current touch strength of the touch operation is greater than or equal to the preset threshold, the mobile terminal performs S405. In a case that the current touch strength of the touch operation is less than the preset threshold, the mobile terminal performs S407.

S405. The mobile terminal cancels the to-be-performed operation.

S406. The mobile terminal cancels the display of the control cancellation area.

S407. The mobile terminal determines whether the touch operation is released at the current touch location.

In a case that the touch operation is released at the current touch location, the mobile terminal performs S408. In a case that the touch operation is not released at the current touch location, the mobile terminal performs S409.

S408. The mobile terminal performs the to-be-performed operation.

S409. The mobile terminal keeps the to-be-performed operation.

The to-be-performed operation corresponding to the touch button includes at least one of: changing a game attribute value of the virtual character object controlled by the user, adding a specified state to the virtual character object, and restricting the mobility of the virtual character object. The changing herein may be increasing or decreasing. The changing a game attribute value of the virtual character object includes: changing health points, changing magic points, changing an agility value, changing a strength value, and changing an intelligence value. The specified state includes, an invincible state, a magically-immune state, a physically-immune state, a void state, a poisoned state, a reduced-speed state, an increased-speed state, and the like. The restricting the mobility is, for example, freezing a virtual target with a freeze spell or dazing a virtual target with a daze spell.

In the embodiment of the present application, in a case that the current touch location of the touch operation is inside the control cancellation area, the mobile terminal further determines whether the current touch strength of the touch operation is greater than or equal to the preset threshold. In a case that the current touch strength of the touch operation is greater than or equal to the preset threshold, the to-be-performed operation is canceled. At this time, the touch operation ends. In contrast, in a case that the current touch location of the touch operation is inside the control cancellation area and the current touch strength of the touch operation is less than the preset threshold, the mobile terminal further determines whether the touch operation is released at the current touch location. In a case that the touch operation is released at the current touch location, the to-be-performed operation corresponding to the touch button is performed. At this time, the touch operation ends. Therefore, even if the location of the touch operation is inside the control cancellation area when the touch operation ends, the to-be-performed operation will not be canceled by mistake provided that the current touch strength inside the control cancellation area is less than the preset threshold. This can effectively prevent an operation form being canceled by mistake and reduce the misoperation rate.

In the embodiment of the present application, in a case that the current touch location of the touch operation is not inside the control cancellation area, the mobile terminal does not need to determine whether the current touch strength of the touch operation is greater than or equal to the preset threshold, but instead further determines whether the touch operation is released at the current touch location. In a case that the touch operation is released at the current touch location, the to-be-performed operation is performed. At this time, the touch operation ends. Therefore, the to-be-performed operation corresponding to the touch button is performed regardless of whether the location of the touch operation when the touch operation ends is in the auxiliary control area or in an area other than the auxiliary control area and the control cancellation area on the touchscreen. For example, after moving the current touch location of the touch operation on a location in the auxiliary control area, the user lifts the finger or the stylus to end the contact with the touchscreen to release the touch operation. In this case, the to-be-performed operation corresponding to the touch button is performed, and the touch operation ends.

In addition, in the embodiment of the present application, in a case that the current touch strength of the touch operation is greater than the preset threshold, the to-be-performed operation is not canceled provided that the current touch location of the touch operation is not inside the control cancellation area.

For better understanding of the technical solutions in the embodiments of the present application, a process that the to-be-performed operation corresponding to the touch button is described from the perspective of man-machine interaction with reference to FIG. 5a, FIG. 5b, FIG. 5c, and FIG. 5d.

As shown in FIG. 5a, the user places the finger on the touch button 302 in the display interface of the mobile terminal. The finger is in contact with the touch button 302 to indicate that the touch button 302 is selected. The location of the touch button 302 is the current touch location of the touch operation. In addition, the display interface of the mobile terminal displays the auxiliary control area 501, the candidate effect range area 502, the control cancellation area 503, and the operation execution area 504.

Figure 5B:
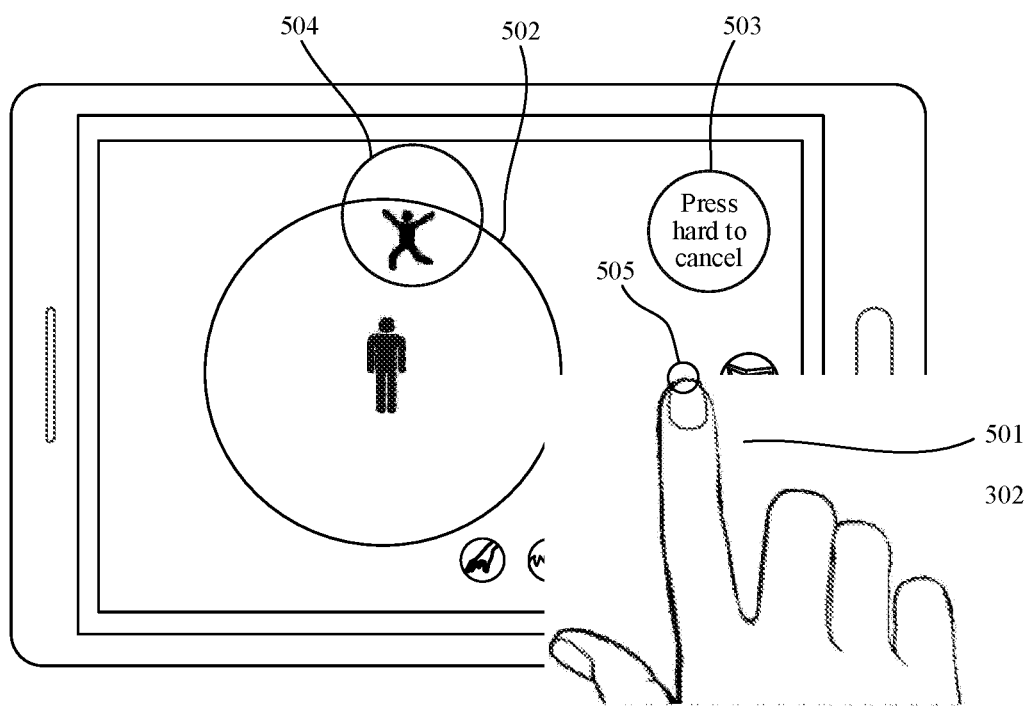

As shown in FIG. 5b, the touch location of the touch operation is moved based on FIG. 5a. The current touch location of the touch operation displays a circular area, that is, the touch location area 505 to indicate a location of the current touch location of the touch operation in the auxiliary control area 501. Compared with the touch location of the touch operation in FIG. 5a, the current touch location of the touch operation is moved to an edge of the auxiliary control area 501 in FIG. 5b. In this case, in the candidate effect range area 502, the operation execution area 504 is displayed at a location having a mapping relationship with the current touch location of the touch operation. The current touch location of the touch operation is not completely moved out of the auxiliary control area 501.

Figure 5C:
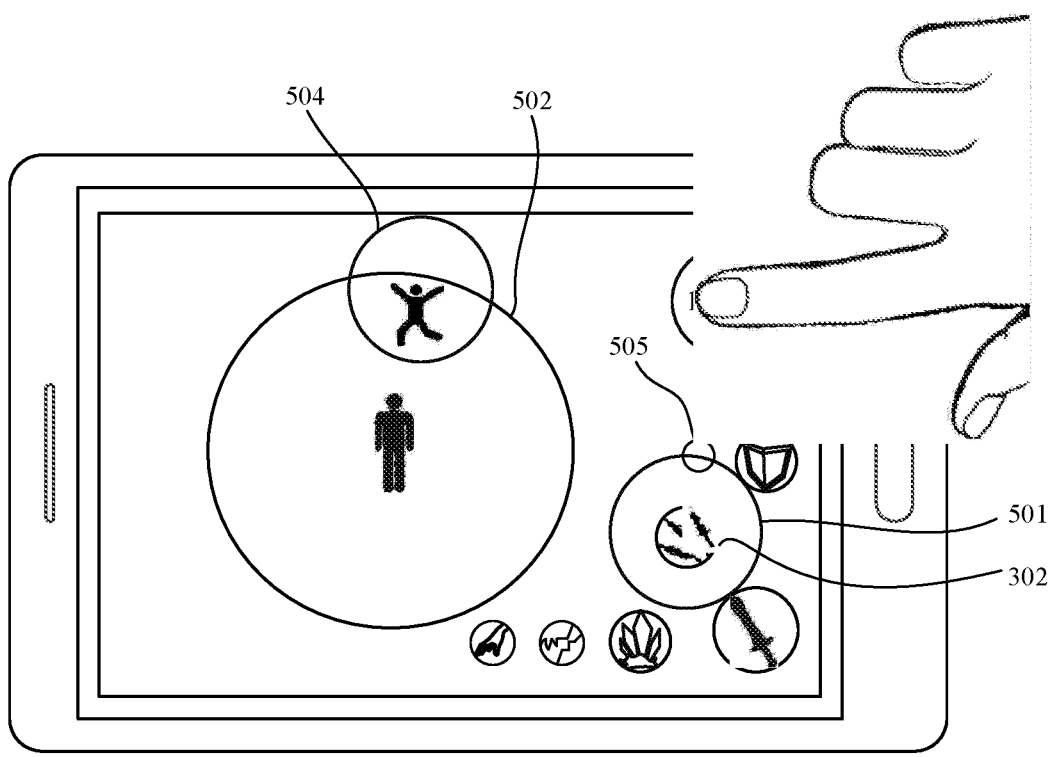

As shown in FIG. 5c, the touch location of the touch operation continues to be moved to the control cancellation area 503 based on FIG. 5b. In this case, the touch location area 505 and the operation execution area 504 both remain at the locations when the touch location of the touch operation is at the edge of the auxiliary control area 501. In FIG. 5c, in a case that the user performs a press operation inside the control cancellation area 503 and the touch strength generated from the press operation is greater than or equal to the preset threshold, the to-be-performed operation corresponding to the touch button 302 is canceled.

Figure 5D:
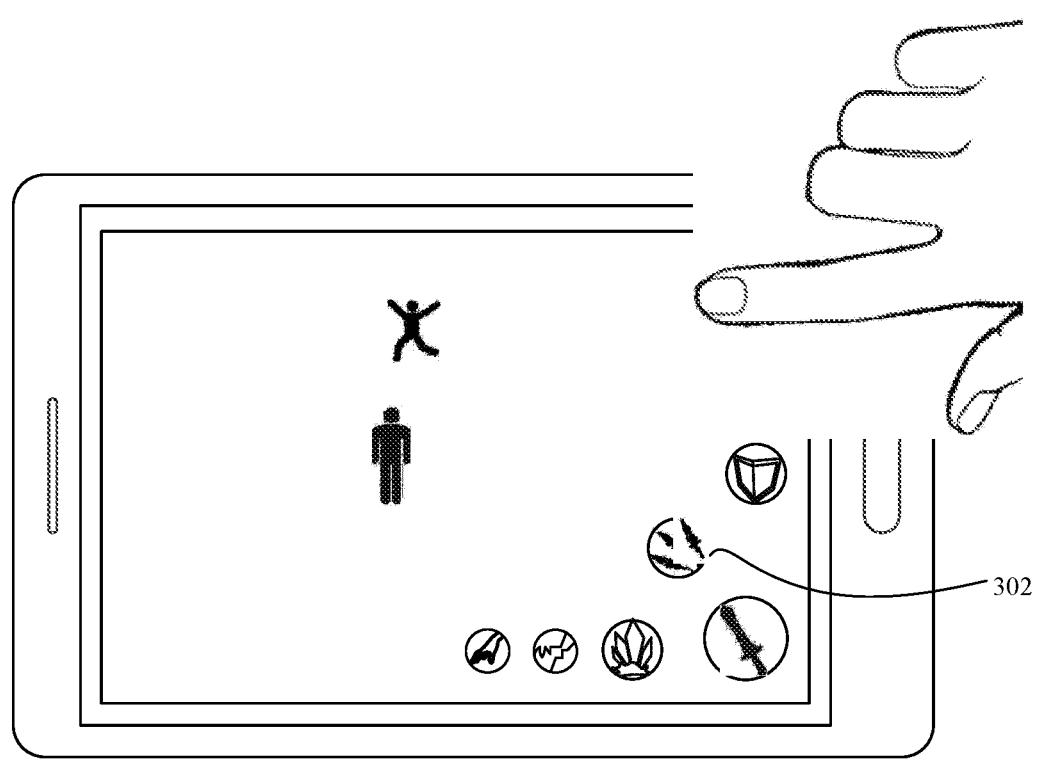

FIG. 5d is a schematic diagram of the display interface after the to-be-performed operation corresponding to the touch button 302 is canceled. The display of the auxiliary control area 501, the candidate effect range area 502, the control cancellation area 503, the operation execution area 504, and the touch location area 505 has been canceled. In the embodiment of the present application, when the touch location of the touch operation enters the control cancellation area 503 and the touch strength generated by performing the press operation is greater than or equal to the preset threshold, the mobile terminal cancels the to-be-performed operation corresponding to the touch button 302. At this time, the touch operation ends. As shown in FIG. 5d, the finger of the user may leave the touchscreen or may be kept at the location where the control cancellation area is displayed. However, the mobile terminal does not continue to respond to the touch operation performed by the user at the location.

In an embodiment, when the user moves the touch location of the touch operation out of the auxiliary control area, the user usually wants to cancel the to-be-performed operation corresponding to the touch button. Therefore, to make it convenient for the user to perform a cancellation operation, the mobile terminal may further adjust the display location of the control cancellation area based on the touch location of the touch operation, so that the touch location of the touch operation can be moved into the control cancellation area faster and by a shorter distance.

Figure 5E:
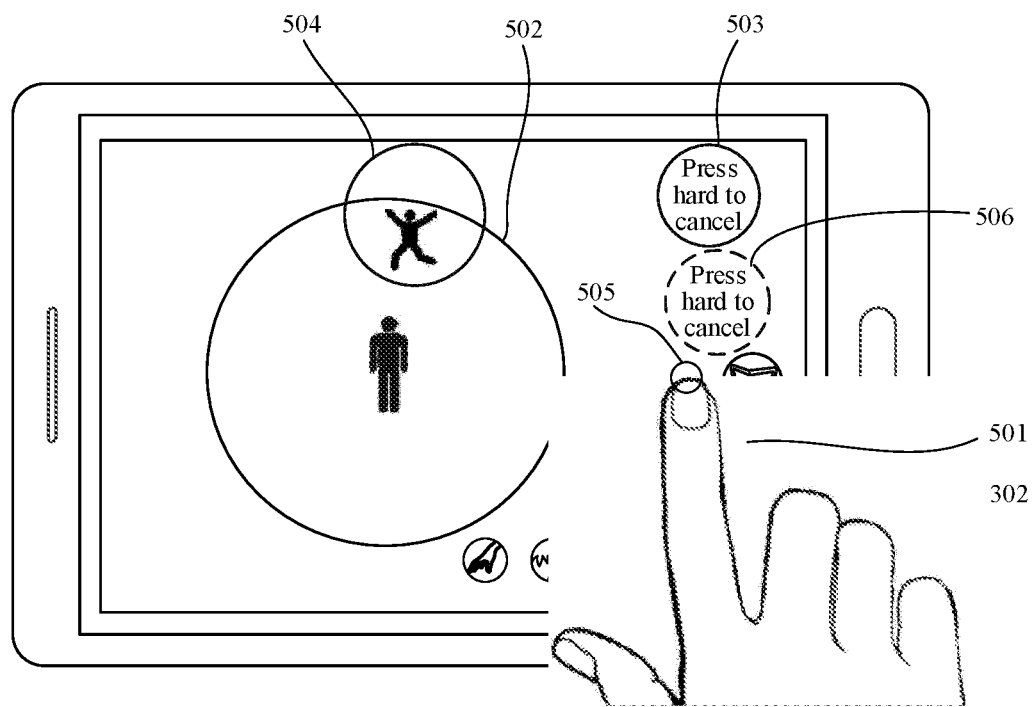

Optionally, the mobile terminal monitors whether the current touch location of the touch operation is in the auxiliary control area. In a case that the current touch location of the touch operation is in the auxiliary control area, it indicates that the user does not intend to cancel the to-be-performed operation corresponding to the touch button. The control cancellation area is displayed at a specified location on the touchscreen. The specified location is also an initial location at which the control cancellation area is displayed. In a case that the current touch location of the touch operation is at the edge of the auxiliary control area within the range in a specified direction, as shown in FIG. 5e, the touch location (that is, the touch location area 505) of the touch operation in FIG. 5e is within the range in a specified direction and is at the edge of the auxiliary control area 501. In this case, the mobile terminal determines, on an trajectory of a connecting line between the touch button 302 and the current touch location, that is, the touch location area 505, of the touch operation, a location at a preset distance from the touch button 302 as a target location 506.

In a case that the current touch location of the touch operation is outside the auxiliary control area, the mobile terminal displays the control cancellation area at the determined target location. The range in a specified direction may be set based on a preset condition. For example, the range in a specified direction may be set as: The mobile terminal displays the auxiliary control area with the touch button being the center, determines a concentric circle with the radius at a specified distance from the radius of the auxiliary control area, determines locations at which the control cancellation area is completely displayed on the concentric circle on the display interface of the touchscreen, and determines directions of all locations formed relative to the touch button as the range in a specified direction. The preset distance is the radius of the concentric circle.

Generally, a difference between the preset distance and the radius of the auxiliary control area is less than a distance between the preset distance and the specified location in a case that the current touch location of the touch operation is at the edge of the auxiliary control area, so that the user can easily cancel the to-be-performed operation corresponding to the touch button by shortening the distance, and the problem of incorrect cancellation can be avoided by setting the preset distance.

That the current touch location of the touch operation is at the edge of the auxiliary control area may be understood as that the center of the current touch location of the touch operation is on the geometric shape defining the auxiliary control area.

The target location may be displayed immediately after being determined, and may be alternatively displayed after the touch location of the touch operation is completely moved out of the auxiliary control area.

In this embodiment, if the touch location of the touch operation is moved back to the auxiliary control area after being moved out of the auxiliary control area, the control cancellation area of the mobile terminal is displayed at the specified location.

For better understanding of this embodiment, refer to FIG. 5a, FIG. 5e, FIG. 5f, FIG. 5g, and FIG. 5h.

As shown in FIG. 5a, the user places the finger on the touch button 302 in the display interface. The finger is in contact with the touch button 302 to indicate that the touch button 302 is selected. In this case, the location of the touch button 302 is the current touch location of the touch operation. In addition, the display interface of the mobile terminal displays the auxiliary control area 501, the candidate effect range area 502, the control cancellation area 503, and the operation execution area 503.

As shown in FIG. 5e, the touch location of the touch operation is moved based on FIG. 5a. The touch location of the touch operation displays a circular area, that is, the touch location area 505 to indicate a location of the touch location of the touch operation in the auxiliary control area 501. Compared with the touch location of the touch operation in FIG. 5a, the current touch location of the touch operation is at the edge of the auxiliary control area 501 in FIG. 5e. In the candidate effect range area 502, the operation execution area 504 is displayed at a location having a mapping relationship with the current touch location of the touch operation. The current touch location 505 of the touch operation is at the edge of the auxiliary control area 501 and is within the range in a specified direction. A target location, that is, the target location 506 in FIG. 5e, at a preset distance from the touch button 302 is determined on an trajectory of the connecting line between the touch button 302 and the current touch location 505 (the target location may be displayed or not displayed at the current time, and if the target location is displayed, the target location is shown by the dashed part in FIG. 5e)

Figure 5F:
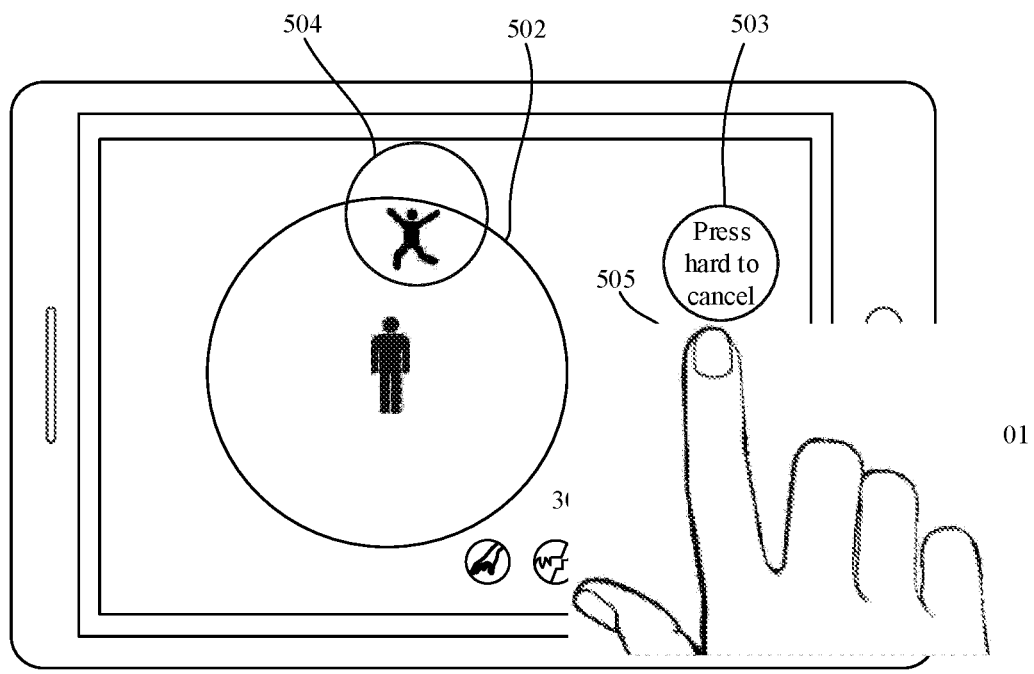

As shown in FIG. 5f, the touch location of the touch operation continues to be moved based on FIG. 5e. In FIG. 5f, the current touch location of the touch operation is outside the auxiliary control area 501 and is not inside the control cancellation area 503. In this case, the touch location area 505 and the operation execution area 504 both remain at the locations when the touch location of the touch operation is at the edge of the auxiliary control area 501. The control cancellation area 503 is displayed at the target location, that is, the location of 506 in FIG. 5e.

Figure 5G:
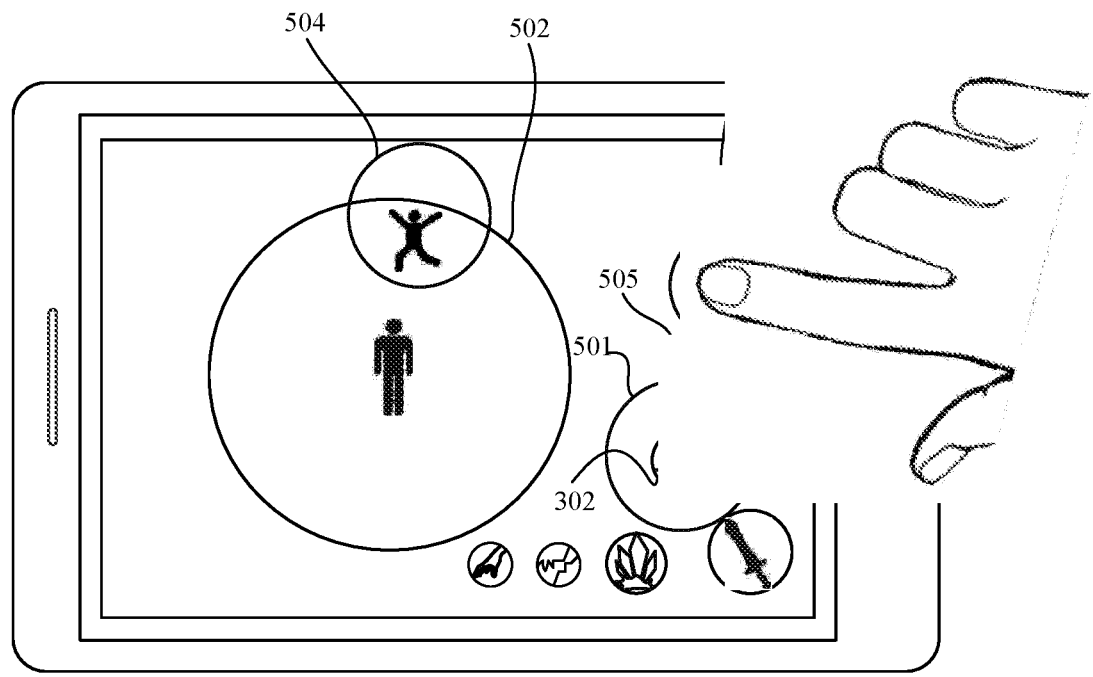

As shown in FIG. 5g, the touch location of the touch operation continues to be moved based on FIG. 5f, and is moved into the control cancellation area 503. That is, the current touch location of the touch operation is inside the control cancellation area 503 in FIG. 5e. In a case that the user performs the press operation at the current touch location of the touch operation and the touch strength generated from the press operation is greater than or equal to the preset threshold, the to-be-performed operation corresponding to the touch button 302 is canceled.

Figure 5H:
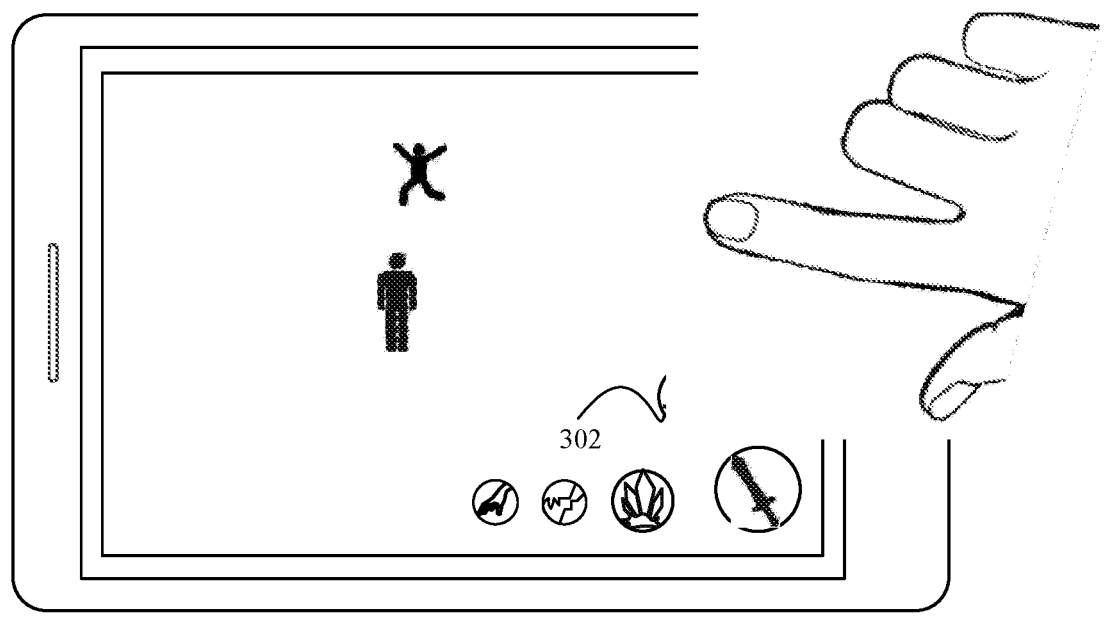

FIG. 5h is a schematic diagram of the display interface of the mobile terminal after the to-be-performed operation corresponding to the touch button 302 is canceled. The display of the auxiliary control area 501, the candidate effect range area 502, the control cancellation area 503, the operation execution area 504, and the touch location area 505 has been canceled. In the embodiment of the present application, when the touch location of the touch operation enters the control cancellation area 503 and the touch strength generated by performing the press operation is greater than or equal to the preset threshold, the mobile terminal cancels the to-be-performed operation corresponding to the touch button 302. At this time, the touch operation ends. As shown in FIG. 5d, the finger of the user may leave the touchscreen or may be kept at the location where the control cancellation area 503 is displayed. However, the mobile terminal does not continue to respond to the touch operation performed by the user at the location.

In the embodiment of the present application, when the touch location of the touch operation is at the edge of the auxiliary control area in a specified direction, the mobile terminal determines a new target location at which the control cancellation area is displayed. After the current touch location of the touch operation is outside the auxiliary control area, the control cancellation area is displayed at the target location. Therefore, the user can move the touch location of the touch operation to the control cancellation area by a shorter distance, so that the user can cancel the to-be-performed operation faster and more conveniently and user experience is further improved.

In the embodiment of the present application, in response to a touch operation on a touch button on a touchscreen, a mobile terminal determines a to-be-performed operation corresponding to the touch button operated by the touch operation, displays a control cancellation area, and determines in real time whether a current touch location of the touch operation is inside the control cancellation area. In a case that the current touch location of the touch operation is inside the control cancellation area, the mobile terminal further determines whether current touch strength of the touch operation is greater than or equal to a preset threshold. In a case that the current touch strength of the touch operation is greater than the preset threshold, the mobile terminal cancels the to-be-performed operation and cancels the display of the control cancellation area. Compared with the related art, in a case that the current touch location of the touch operation is inside the control cancellation area, the mobile terminal further determines whether the current touch strength of the touch operation is greater than or equal to the preset threshold, so that the current touch strength and the current touch location of the touch operation can be combined to determine whether to cancel the to-be-performed operation corresponding to the touch button, thereby effectively improving the accuracy of determining whether to cancel a to-be-performed operation and reducing the misoperation rate.

Figure 6:
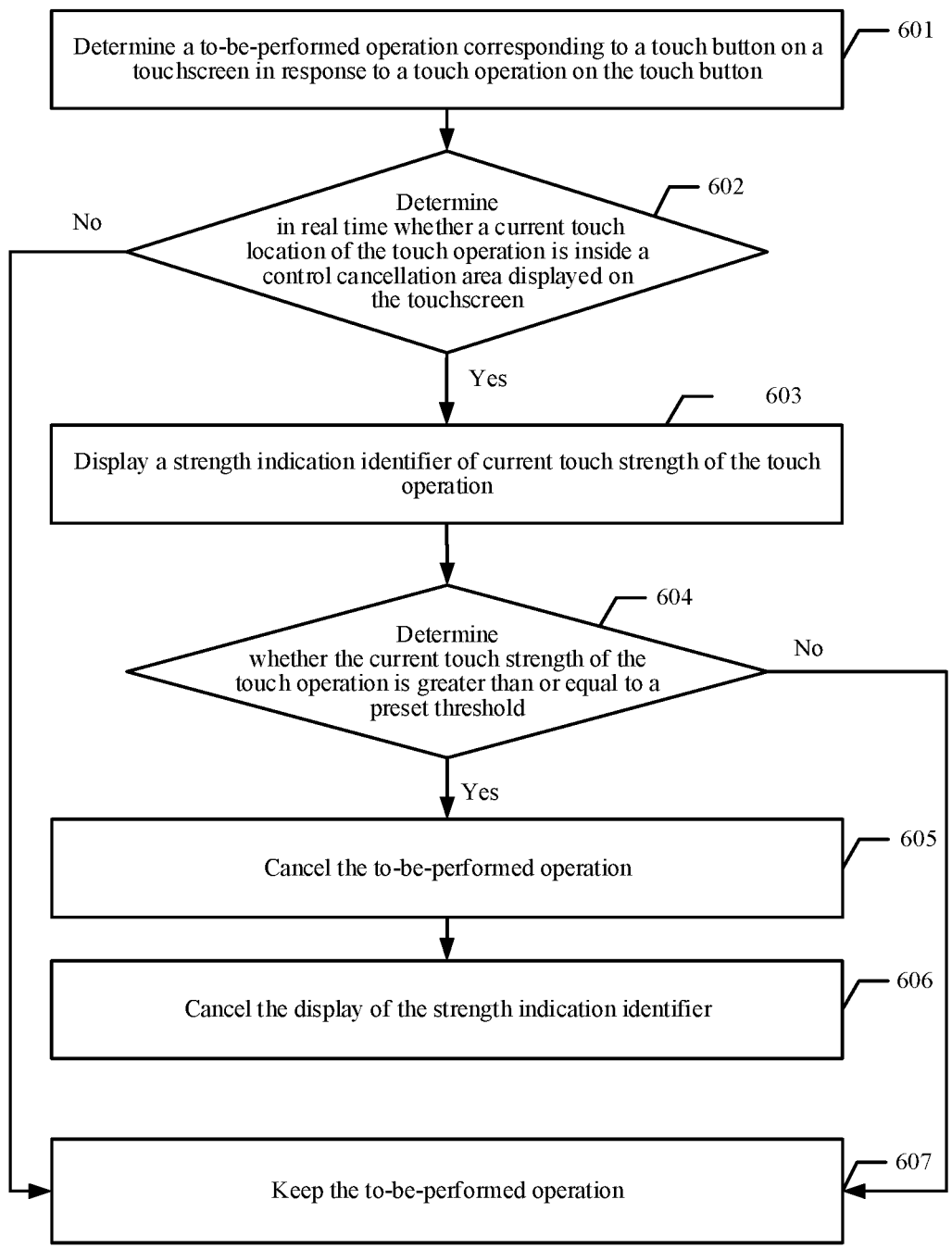
FIG. 6 is a schematic flowchart of a touchscreen-based control method according to an embodiment of the present application.

In the embodiment of the present application, to make it convenient for the user to cancel the to-be-performed operation, the mobile terminal may further display a strength indication identifier in a case that the current touch location of the touch operation is inside the control cancellation area. Based on FIG. 2, FIG. 6 is a schematic flowchart of a touchscreen-based control method according to another embodiment of the present application. The method includes the following steps:

S601. A mobile terminal determines a to-be-performed operation corresponding to a touch button on a touchscreen in response to a touch operation on the touch button.

S602. The mobile terminal determines in real time whether a current touch location of the touch operation is inside a control cancellation area displayed on the touchscreen.

In a case that the current touch location of the touch operation is inside the control cancellation area, the mobile terminal performs S603. In a case that the current touch location of the touch operation is not inside the control cancellation area, the mobile terminal performs S607.

S603. The mobile terminal displays a strength indication identifier of current touch strength of the touch operation.

S604. The mobile terminal determines whether the current touch strength of the touch operation is greater than or equal to a preset threshold.

In a case that the current touch strength of the touch operation is greater than or equal to the preset threshold, the mobile terminal performs S605. In a case that the current touch strength of the touch operation is less than the preset threshold, the mobile terminal performs S607.

S605. The mobile terminal cancels the to-be-performed operation.

S606. The mobile terminal cancels the display of the strength indication identifier.

S607. The mobile terminal keeps the to-be-performed operation.

In the embodiment of the present application, S601, S602, and S604 are respectively similar to the content described in S201 to S203 in the embodiment shown in FIG. 2. Details are not described herein again.

In the embodiment of the present application, in a case that the current touch location of the touch operation is inside the control cancellation area, the mobile terminal displays the strength indication identifier of the current touch strength to make it convenient for the user to learn about the current touch strength applied by the user at the current touch location.

The strength indication identifier may be a strength progress bar. The strength progress bar may be displayed vertically or horizontally, and is displayed on an upper side, a lower side or a left side of the control cancellation area, or in an area where the strength progress bar is not covered when another finger of the user is in the control area.

Progress of the strength progress bar may be displayed by a specified color, for example, black, red, green or yellow. An area other than the progress of the strength progress bar is displayed by another color different from the specified color.

Figure 7A:
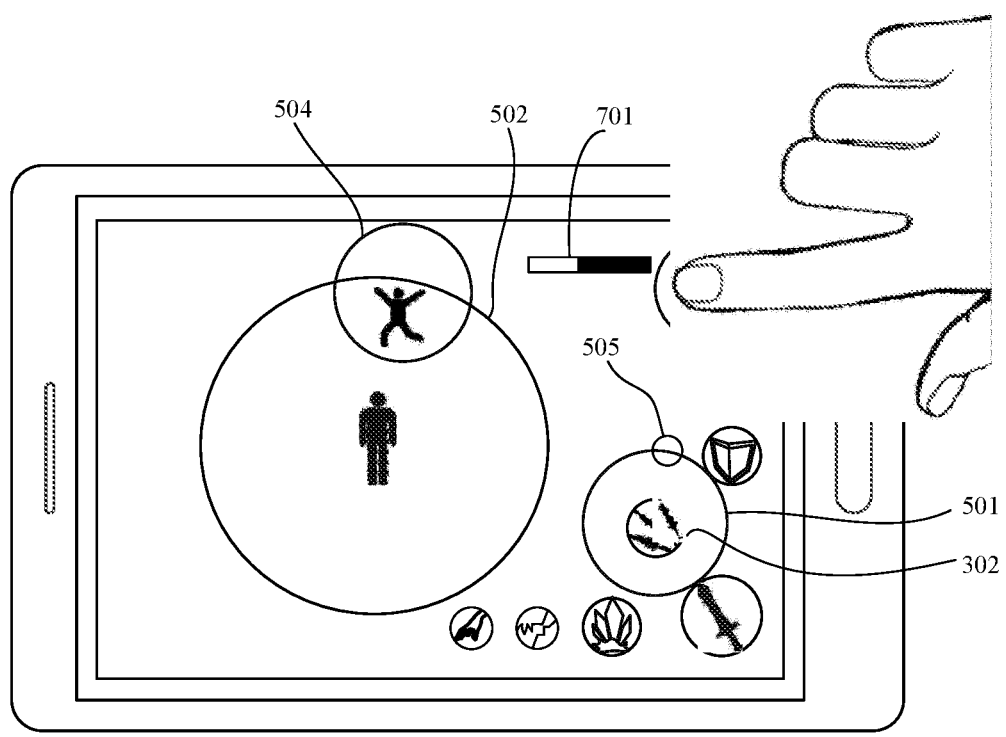
FIG. 7a and FIG. 7b are schematic diagrams of a display interface of a touchscreen according to an embodiment of the present application.

A progress displayed in the strength progress bar is correlated with the current touch strength of the touch operation. The displayed progress may be directly proportional to the current touch strength. For example, when the strength progress bar reaches 100%, it indicates that the current touch strength is greater than or equal to the preset threshold. When the strength progress bar does not reach 100%, it indicates that the current touch strength is less than the preset threshold. As the current touch strength gradually increases to the preset threshold, the progress in the strength progress bar gradually increases to 100%. For example, as shown in FIG. 7a, the current touch location of the touch operation is inside the control cancellation area 503. In this case, the touch location area 505 and the operation execution area 504 both remain at the locations when the touch location of the touch operation is at the edge of the auxiliary control area 501, and the auxiliary control area 501 and the candidate effect range area 502 are still displayed. The strength progress bar 701 is displayed horizontally on the left side of the control cancellation area 503. The black part in the strength progress bar 701 indicates the progress matching the current touch strength.

When the strength is displayed by the progress, a rectangular strength progress bar or another graphic may be used to display the strength. The strength progress bar is only one of feasible implementations. During actual application, a strength progress circle or a gourd shape may be used instead. This is not limited herein.

In the embodiment of the present application, the strength indication identifier may be alternatively a strength presentation area. The strength presentation area may be a regular shape such as a circle with the current touch location being the center. A size of the strength presentation area may be directly proportional to the touch strength. Greater touch strength indicates a larger strength presentation area.

Figure 7B:
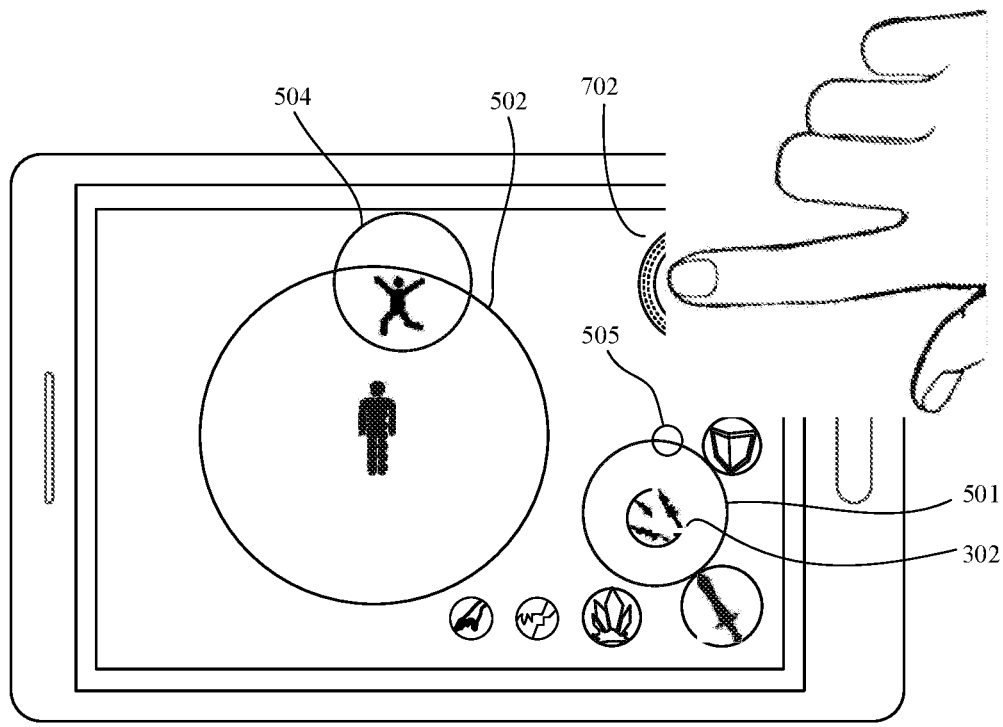

The strength presentation area may also include a dynamic effect, for example, a ripple effect of a ripple gradually spreading out from the current touch location. The ripple disappears when reaching an edge of the strength presentation area. For example, as shown in FIG. 7, the current touch location of the touch operation is inside the control cancellation area 503. In this case, the touch location area 505 and the operation execution area 504 both remain at the locations when the touch location of the touch operation is at the edge of the auxiliary control area 501, and the auxiliary control area 501 and the candidate effect range area 502 are still displayed. In addition, the strength presentation area 702 is also displayed. A size of an area formed by the outermost circle of the strength presentation area 702 indicates magnitude of the strength. Greater current touch strength indicates a larger strength presentation area 702. There is another dashed line in the strength presentation area 702. The dashed line represents a ripple of the ripple effect. When the finger of the user increases the applied touch strength, the mobile terminal displays the ripple effect. That is, the ripple spreads out from the current touch location, so that the user intuitively observes the magnitude of the current touch strength.

In the embodiment of the present application, after the strength indication identifier is displayed, if the touch location of the touch operation continues to be moved and is moved out of the control cancellation area, that is, the current touch location is outside the control cancellation area, the display of the strength indication identifier is canceled.

In the embodiment of the present application, in a case that the current touch location of the touch operation is inside the control cancellation area, the mobile terminal displays the strength indication identifier. The strength indication identifier is used for showing the magnitude of the current touch strength to the user, so that the user can conveniently and intuitively observe the strength applied at the current touch location, thereby providing the user with better operation experience.

The embodiment shown in FIG. 6 is a technical solution to which the strength indication identifier is added based on FIG. 2. In another feasible embodiment, the embodiment shown in FIG. 6 is a technical solution to which the strength indication identifier is added based on FIG. 4. Details are not described herein.

Figure 8:
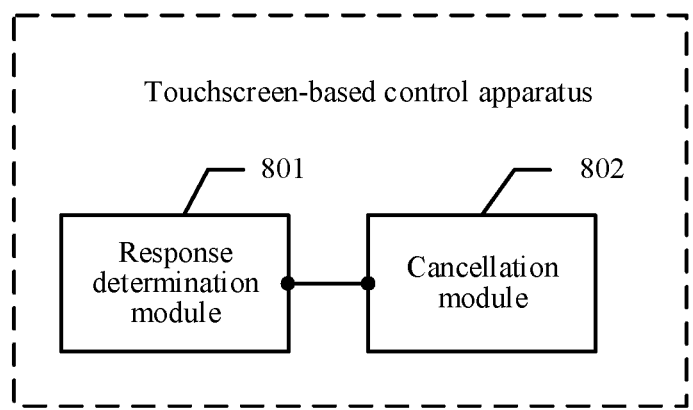
FIG. 8 is a schematic structural diagram of program modules of a touchscreen-based control apparatus according to an embodiment of the present application.

FIG. 8 is a schematic structural diagram of program modules of a touchscreen-based control apparatus according to an embodiment of the present application. The apparatus includes:

a response determination module 801, configured to determine a to-be-performed operation corresponding to a touch button on a touchscreen in response to a touch operation on the touch button.

In the embodiment of the present application, different touch buttons may be displayed on a display interface. A touch button is configured to intuitively display an operation that can be implemented by the button, and each touch button corresponds to one operation. The shape, size, and location of a touch button may be set according to a specific requirement. Different touch buttons can be distinguished by at least one or a combination of texts, symbols or patterns in the touch button or colors of the touch button. FIG. 3 is a schematic diagram of touch buttons on a touchscreen. The touchscreen displays touch buttons 301, 302, 303, and 304, and each touch button corresponds to a specific operation.

After the mobile terminal displays the touch buttons, a user may use a finger, another part of the body or a stylus to touch the touchscreen of the mobile terminal to perform a touch operation, so that the user selects a touch button through the touch operation. The mobile terminal determines the to-be-performed operation corresponding to the touch button in response to the touch operation on the touch button on the touchscreen. Unless otherwise specified, the touch button in subsequent descriptions is the touch button initially selected by the user when performing the touch operation.

The touch operation is an operation that remains in contact with the touch screen. It indicates that the touch operation is released and the touch operation ends in a case that the touch operation is no longer in contact with the touchscreen. The user may further perform a press operation when performing the touch operation, that is, increase the touch strength applied to the touchscreen while remaining in contact with the touchscreen.

The apparatus further includes: a cancellation module 802, configured for canceling the to-be-performed operation in a case that a current touch location of the touch operation is inside a control cancellation area displayed on the touchscreen and current touch strength of the touch operation is greater than or equal to a preset threshold.

In this embodiment of the present application, the control cancellation area is displayed on the touchscreen. The control cancellation area is configured for canceling the to-be-performed operation. Optionally, if the to-be-performed operation needs to be canceled, the user needs to move the finger or the stylus performing the touch operation and increases the touch strength generated by the touch operation to enable the touch location of the touch operation to be inside the control cancellation area. The touch strength of the touch operation is greater than or equal to the preset threshold. The value of the preset threshold may be set according to a specific case. The preset threshold usually can effectively distinguish a pressure value generated by a normal touch from a pressure value generated by pressing.

In a process of keeping in contact with the touchscreen during the touch operation, the mobile terminal monitors the current touch location of the touch operation in real time and determines whether the current touch location of the touch operation is inside the control cancellation area. In a case that the current touch location of the touch operation is inside the control cancellation area, the mobile terminal further determines whether the current touch strength at the current touch location of the touch operation is greater than or equal to the preset threshold to determine to whether to cancel the to-be-performed operation. A pressure sensor is disposed inside the touchscreen of the mobile terminal. The pressure sensor can detect the touch strength applied at the current touch location of the touch operation when the user performs the touch operation.

When the current touch strength of the touch operation is greater than or equal to the preset threshold, it indicates that the user increases the applied strength when performing the touch operation, and the mobile terminal will trigger a cancellation function, that is, cancel the to-be-performed operation. The current touch strength and the current touch location of the touch operation are touch strength and a touch location at the same time that are detected in real time.

In a case that the current touch location of the touch operation is not inside the control cancellation area, the mobile terminal does not need to further determine whether the current touch strength of the touch operation is greater than or equal to the preset threshold but instead keeps the to-be-performed operation. In addition, in a case that the current touch location of the touch operation is inside the control cancellation area, in a case that the current touch strength of the touch operation is less than the preset threshold, the to-be-performed operation is not canceled.

In this embodiment, in a case that the current touch location of the touch operation is inside the control cancellation area, the mobile terminal further determines whether the current touch strength of the touch operation is greater than or equal to the preset threshold, so that the current touch strength and the current touch location of the touch operation can be combined to determine whether to cancel the to-be-performed operation, thereby effectively improving the accuracy of determining whether to cancel a to-be-performed operation and reducing a probability of canceling a to-be-performed operation by mistake, that is, reducing the misoperation rate.

Figure 9:
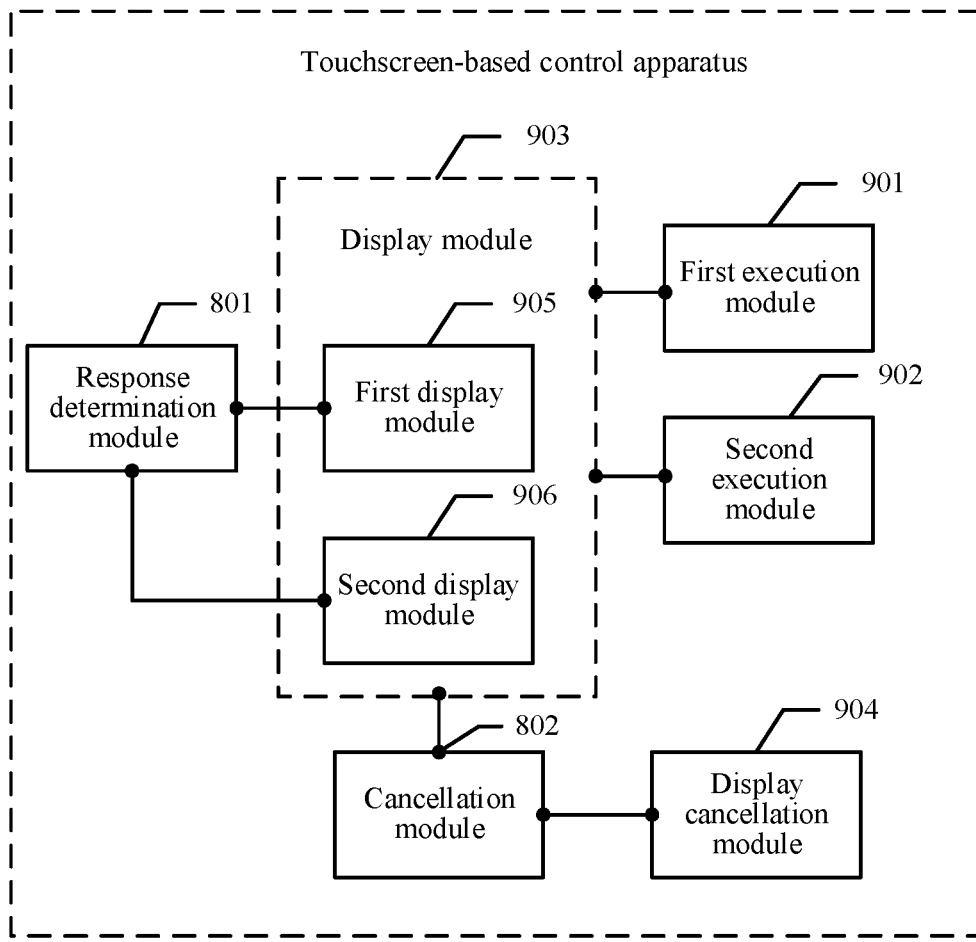
FIG. 9 is a schematic structural diagram of program modules of a touchscreen-based control apparatus according to an embodiment of the present application.

FIG. 9 is a schematic structural diagram of program modules of a touchscreen-based control apparatus according to an embodiment of the present application. The apparatus includes the response determination module 801 and the cancellation module 802 in the embodiment shown in FIG. 8.

In the embodiment of the present application, the apparatus further includes:

a first execution module 901, configured to perform the to-be-performed operation corresponding to the touch button in a case that the touch operation is released and the current touch strength of the touch operation is less than the preset threshold.

Optionally, the apparatus further includes:

a second execution module 902, configured to perform the to-be-performed operation in a case that a location at which the touch operation is released is inside the control cancellation area and the touch strength of the touch operation is less than the preset threshold.

Optionally, the apparatus further includes:

a display module 903, configured to display the control cancellation area following the response determination module 801; and a first display cancellation module 904, configured for canceling the display of the control cancellation area following the cancellation module 802.

Optionally, the display module 903 includes:

a first display module 905, configured to display the control cancellation area at a specified location on the touchscreen in a case that the current touch location of the touch operation is inside a displayed auxiliary control area, where the auxiliary control area is an area formed with the touch button being the center; and a second display module 906, configured to: determine a location at a preset distance from the touch button as a target location on an trajectory of a connecting line between the touch button and the current touch location of the touch operation in a case that the current touch location of the touch operation is at an edge of the auxiliary control area within a range in a specified direction, and display the control cancellation area at the target location in a case that the current touch location of the touch operation is outside the auxiliary control area.

In the embodiment of the present application, the control cancellation area may be displayed when the user performs the touch operation on the touch button displayed on the touchscreen, and the control cancellation area is displayed at a preset specified location.

The control cancellation area may be an area defined by a regular polygon, for example, a circle, a rectangle or a hexagon. Alternatively, the control cancellation area is an area formed by splicing a plurality of specified geometric shapes, for example, a hexagon formed by a plurality of isosceles triangles.

Optionally, to facilitate the operation of the user, the mobile terminal may also display a text label inside the control cancellation area. The text label indicates the function of the control cancellation area to the user. For example, "Press hard to cancel" may be displayed inside the control cancellation area to prompt the user to keep the touch operation after selecting the control button through the touch operation, move the touch location of the touch operation into the control cancellation area, and cancel the to-be-performed operation by pressing.

In the embodiment of the present application, when the user performs the touch operation on the touch button, the touchscreen also displays an auxiliary control area and a candidate effect range area. The area of the candidate effect range area is greater than that of the auxiliary control area, and there is a location mapping relationship between the auxiliary control area and the candidate effect range area.

The auxiliary control area is an area in which the user performs an operation, and the candidate effect range area is an optional area used for determining an effect range of the to-be-performed operation.

The location of the candidate effect range area may be determined according to the location of a current virtual character object of the user. The current virtual character object of the user is a virtual character object controlled by the user using the mobile terminal. Optionally, the mobile terminal may display the candidate effect range area with the location of the current virtual character object of the user being the center.

After the user selects the touch button by using the touch operation, the mobile terminal displays the auxiliary control area with the touch button being the center. The user may keep the touch operation in contact with the touchscreen in the auxiliary control area, and simultaneously change the touch location of the touch operation, so that the mobile terminal determines an operation execution area of the to-be-performed operation corresponding to the touch button in the candidate effect range area based on the current touch location of the touch operation and the location mapping relationship. In a manner of setting the auxiliary control area and the candidate effect range area, the user performs the touch operation in a relatively small auxiliary control area without needing to move and operate significantly within the range of the touchscreen. To clearly know about the current touch location of the touch operation in the auxiliary control area, a touch location area may also be displayed. The touch location area is used for identifying the current touch location of the touch operation. Generally, the touch location area may be a small circular area.

Based on the foregoing descriptions, after the user performs the touch operation on the touch button on the touchscreen, the touchscreen not only displays the control cancellation area, but also displays the auxiliary control area, the candidate effect range area, and the touch location area. The control cancellation area, the auxiliary control area, and the candidate effect range area are independent of each other and do not intersect with each other. FIG. 5a is a schematic diagram of a display interface of a touchscreen when a touch operation is performed. A user places a finger on a touch button 302 in the display interface. The finger is in contact with the touch button 302 to indicate that the touch button 302 is selected. The display interface displays an auxiliary control area 501, a candidate effect range area 502, and a control cancellation area 503, and displays an operation execution area 504 in the candidate effect range area 502 based on a current touch location of the touch operation.

The virtual character object controlled by the user includes a player-controlled character being a virtual target. The virtual target is a digital operable object. Virtual targets also include an NPC. In a MOBA game, a player-controlled character may be called a hero. Every hero has a name and spells with various effects. A player-controlled character has a growth feature and changes as a game progresses. An NPC is a game character automatically controlled in a MOBA game. An NPC usually has various constant game attributes or a relatively weak growth feature. An NPC may be a mounted solider, an infantryman, an archer, a mage, an arrow tower, a turret, a magic tower, a catapult, a mortar, a beast soldier, or the like.

The to-be-performed operation corresponding to the touch button includes at least one of: changing a game attribute value of the virtual character object controlled by the user, adding a specified state to the virtual character object, and restricting the mobility of the virtual character object. The changing herein may be increasing or decreasing. The changing a game attribute value of the virtual character object includes: changing health points, changing magic points, changing an agility value, changing a strength value, and changing an intelligence value. The specified state includes, an invincible state, a magically-immune state, a physically-immune state, a void state, a poisoned state, a reduced-speed state, an increased-speed state, and the like. The restricting the mobility is, for example, freezing a virtual target with a freeze spell or dazing a virtual target with a daze spell.

In the embodiment of the present application, in response to a touch operation on a touch button on a touchscreen, a mobile terminal determines a to-be-performed operation corresponding to the touch button operated by the touch operation, displays a control cancellation area, and determines in real time whether a current touch location of the touch operation is inside the control cancellation area. In a case that the current touch location of the touch operation is inside the control cancellation area, the mobile terminal further determines whether current touch strength of the touch operation is greater than or equal to a preset threshold. In a case that the current touch strength of the touch operation is greater than the preset threshold, the mobile terminal cancels the to-be-performed operation and cancels the display of the control cancellation area. Compared with the related art, in a case that the current touch location of the touch operation is inside the control cancellation area, the mobile terminal further determines whether the current touch strength of the touch operation is greater than or equal to the preset threshold, so that the current touch strength and the current touch location of the touch operation can be combined to determine whether to cancel the to-be-performed operation corresponding to the touch button, thereby effectively improving the accuracy of determining whether to cancel a to-be-performed operation and reducing the misoperation rate.

Figure 10:
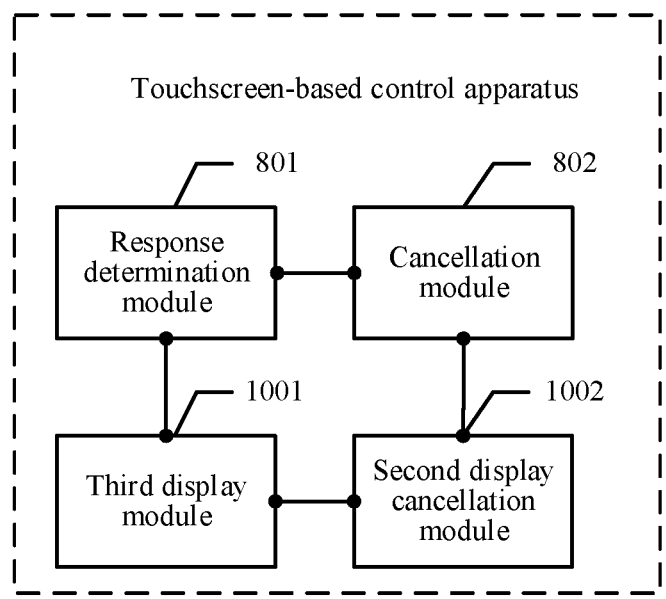
FIG. 10 is a schematic structural diagram of program modules of a touchscreen-based control apparatus according to an embodiment of the present application.

FIG. 10 is a schematic structural diagram of program modules of a touchscreen-based control apparatus according to another embodiment of the present application. The apparatus includes: the response determination module 801 and the cancellation module 802 shown in FIG. 8 that are similar to the content described in the embodiment shown in FIG. 8. Details are not described herein.

In the embodiment of the present application, the control apparatus further includes:

a third display module 1001, configured to display a strength indication identifier of the current touch strength of the touch operation in a case that the current touch location of the touch operation is inside the control cancellation area displayed on the touchscreen; and a second display cancellation module 1002, configured to: cancel the display of the strength indication identifier following the cancellation module 802, or cancel the display of the strength indication identifier in a case that the current touch location of the touch operation is outside the control cancellation area in response to the display of the strength indication identifier.

The strength indication identifier may be a strength progress bar. The strength progress bar may be displayed vertically or horizontally, and is displayed on an upper side, a lower side or a left side of the control cancellation area, or in an area where the strength progress bar is not covered when another finger of the user is in the control area.

Progress of the strength progress bar may be displayed by a specified color, for example, black, red, green or yellow. An area other than the progress of the strength progress bar is displayed by another color different from the specified color.

A progress displayed in the strength progress bar is correlated with the current touch strength of the touch operation. The displayed progress may be directly proportional to the current touch strength. For example, when the strength progress bar reaches 100%, it indicates that the current touch strength is greater than or equal to the preset threshold. When the strength progress bar does not reach 100%, it indicates that the current touch strength is less than the preset threshold. As the current touch strength gradually increases to the preset threshold, the progress in the strength progress bar gradually increases to 100%. For example, as shown in FIG. 7*a*, the current touch location of the touch operation is inside the control cancellation area 503. In this case, the touch location area 505 and the operation execution area 504 both remain at the locations when the touch location of the touch operation is at the edge of the auxiliary control area 501, and the auxiliary control area 501 and the candidate effect range area 502 are still displayed. The strength progress bar 701 is displayed horizontally on the left side of the control cancellation area 503. The black part in the strength progress bar 701 indicates the progress matching the current touch strength.

When the strength is displayed by the progress, a rectangular strength progress bar or another graphic may be used to display the strength. The strength progress bar is only one of feasible implementations. During actual application, a strength progress circle or a gourd shape may be used instead. This is not limited herein.

In the embodiment of the present application, the strength indication identifier may be alternatively a strength presentation area. The strength presentation area may be a regular shape such as a circle with the current touch location being the center. A size of the strength presentation area may be directly proportional to the touch strength. Greater touch strength indicates a larger strength presentation area.

The strength presentation area may also include a dynamic effect, for example, a ripple effect of a ripple gradually spreading out from the current touch location. The ripple disappears when reaching an edge of the strength presentation area. For example, as shown in FIG. 7, the current touch location of the touch operation is inside the control cancellation area 503. In this case, the touch location area 505 and the operation execution area 504 both remain at the locations when the touch location of the touch operation is at the edge of the auxiliary control area 501, and the auxiliary control area 501 and the candidate effect range area 502 are still displayed. In addition, the strength presentation area 702 is also displayed. A size of an area formed by the outermost circle of the strength presentation area 702 indicates magnitude of the strength. Greater current touch strength indicates a larger strength presentation area 702. There is another dashed line in the strength presentation area 702. The dashed line represents a ripple of the ripple effect. When the finger of the user increases the applied touch strength, the mobile terminal displays the ripple effect. That is, the ripple spreads out from the current touch location, so that the user intuitively observes the magnitude of the current touch strength.

In the embodiment of the present application, after the strength indication identifier is displayed, if the touch location of the touch operation continues to be moved and is moved out of the control cancellation area, that is, the current touch location is outside the control cancellation area, the display of the strength indication identifier is canceled.

In the embodiment of the present application, in a case that the current touch location of the touch operation is inside the control cancellation area, the strength indication identifier is displayed. The strength indication identifier is used for showing the magnitude of the current touch strength to the user, so that the user can conveniently and intuitively observe the strength applied at the current touch location, thereby providing the user with better operation experience.

Figure 11:
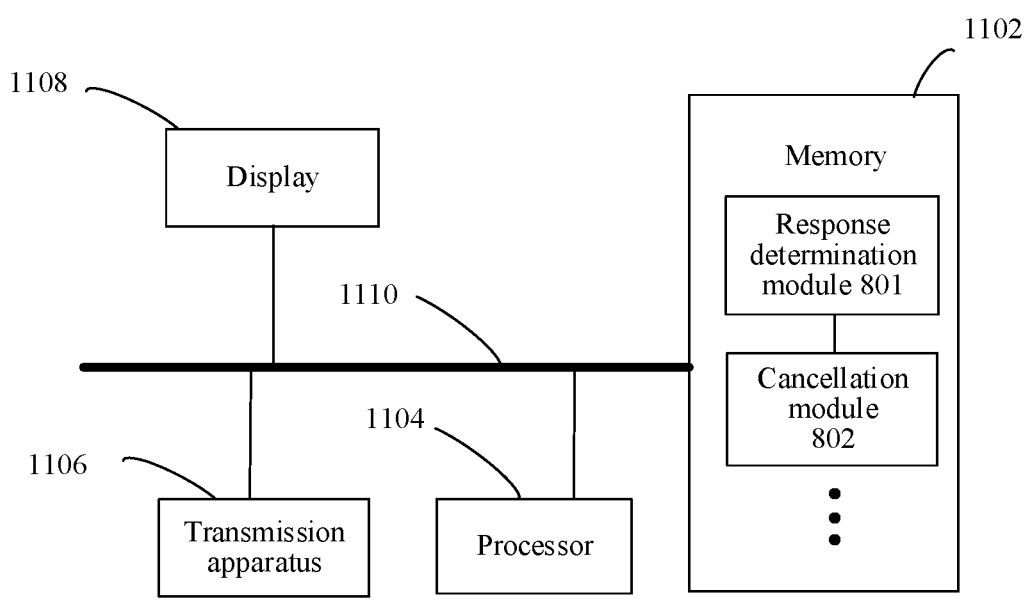
FIG. 11 is a structural block diagram of another mobile terminal according to an embodiment of the present application.

According to still another aspect of the embodiment of the present disclosure, another mobile terminal configured to implement the foregoing touchscreen-based control method is provided. As shown in FIG. 11, the mobile terminal includes a memory 1102 and a processor 1104. The memory 1102 stores a computer program. The processor 1104 is configured to perform the steps in any one of the foregoing method embodiments by using the computer program.

Optionally, in this embodiment, the foregoing mobile terminal may be located in at least one of a plurality of network devices in a computer network.

Optionally, in this embodiment, the processor may be configured to, by using the computer program, perform the following steps:

S1. determining a to-be-performed operation corresponding to a touch button on a touchscreen in response to a touch operation on the touch button; and S2. canceling the to-be-performed operation in a case that a current touch location of the touch operation is inside a control cancellation area displayed on the touchscreen and current touch strength of the touch operation is greater than or equal to a preset threshold.

Optionally, a person of ordinary skill in the art may understand that the structure shown in FIG. 11 is merely an example, and the mobile terminal may also be a terminal device such as a smartphone (for example, an Android phone and an iOS phone), a tablet computer, a palmtop computer, a Mobile Internet Device (MID), and a PAD. FIG. 11 does not constitute a limitation on a structure of the foregoing electronic device. For example, the mobile terminal may further include more or fewer components (for example, a network interface) than those shown in FIG. 11, or have configuration different with that shown in FIG. 11.

The memory 1102 may be configured to store a software program and module, such as a program instruction/module corresponding to the touchscreen-base control method and apparatus in the embodiments of the present disclosure. The processor 1104 runs the software program and module stored in the memory 1102, to perform various functional applications and data processing, thereby implementing the foregoing touchscreen-based control method. The memory 1102 may include a high-speed random access memory (RAM), and may further include a non-volatile memory, for example, one or more magnetic storage apparatuses, a flash memory, or another non-volatile solid-state memory. In some examples, the memory 1102 may further include a memory disposed remote to the processor 1104, and the remote memory may be connected to the terminal through a network. Examples of the network include, but are not limited to, the Internet, an intranet, a local area network, a mobile communications network, and a combination thereof. The memory 1102 may be specifically configured to store information such as the to-be-performed operation, but is not limited thereto. For example, as shown in FIG. 11, the memory 1102 may include, but is not limited to, the response determination module 801 and the cancellation module 802 in the foregoing touchscreen-based control apparatus. In addition, the memory 1102 may also include, but is not limited to another module unit in the foregoing touchscreen-based control apparatus. Details are not described again in this example.

Optionally, a transmission apparatus 1106 is configured to receive or transmit data by using a network. Specific examples of the network include a wired network and a wireless network. In an example, the transmission apparatus 1106 includes a network interface controller (NIC), which may be connected to another network device and router by using a cable, so as to communicate with the Internet or a local area network. In an example, the transmission apparatus 1106 is an RF module, and the RF module is configured to communicate with the Internet in a wireless manner.

In addition, the electronic device further includes: a display 1108, configured to display the to-be-performed operation corresponding to the touch operation; and a connection bus 1110, configured to connect module components in the mobile terminal.

According to still another aspect of the embodiments of the present disclosure, a storage medium is further provided. The storage medium stores a computer program, the computer program being configured to perform the steps in any one of the foregoing method embodiments when being run.

Optionally, in this embodiment, the storage medium may be configured to store a computer program used for performing the following steps:

S1. determining a to-be-performed operation corresponding to a touch button on a touchscreen in response to a touch operation on the touch button; and S2. canceling the to-be-performed operation in a case that a current touch location of the touch operation is inside a control cancellation area displayed on the touchscreen and current touch strength of the touch operation is greater than or equal to a preset threshold.

Optionally, in this embodiment, a person of ordinary skill in the art may understand that all or some of the steps of the methods in the embodiments may be implemented by a program instructing hardware related to a terminal device. The program may be stored in a computer-readable storage medium, and the storage medium may be a flash drive, a read-only memory (ROM), a RAM, a magnetic disk, an optical disc, and so on.

In the several embodiments provided in the present application, it is to be understood that the disclosed apparatus and method may be implemented in other manners. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network modules. Some or all of the modules may be selected to achieve the objective of the embodiment solutions according to an actual need.

In addition, functional modules in the embodiments of in the present application may be integrated into one processing module, or each of the modules may exist alone physically, or two or more modules are integrated into one module. The integrated modules may be implemented in the form of hardware, or may be implemented in the form of a software functional module.

If implemented in the form of software functional modules and sold or used as an independent product, the integrated modules may be stored in a computer-readable storage medium. Based on such an understanding, the technical solutions of the present application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present application. The foregoing storage medium includes any medium that can store program code, such as a USB flash drive, a removable hard disk, a ROM, a RAM, a magnetic disk or an optical disc.

For brief description, the foregoing method embodiments are represented as a series of actions. However, it is to be appreciated by a person skilled in the art that the present application is not limited to the described order of the actions, because some steps may be performed in other orders or simultaneously according to the present application. In addition, it is to be understood by a person skilled in the art that the embodiments described in the specification all belong to optional embodiments and the actions and modules are not necessary for the present application.

In the foregoing embodiments, the descriptions of the embodiments have respective focuses. For a part that is not described in detail in an embodiment, refer to related descriptions in other embodiments.

Described above are a touchscreen-based control method and apparatus, a mobile terminal, and a readable storage medium provided in the present application. A person skilled in the art may make modifications to the specific implementations and the application scope according to the ideas of the embodiments of the present application. In summary, the content of the specification is not intended to be construed as a limitation to the present application.

INDUSTRIAL APPLICABILITY

In this embodiment, a touchscreen-based control method is used. The method includes: determining, by a mobile terminal, a to-be-performed operation corresponding to a touch button on a touchscreen in response to a touch operation on the touch button; and canceling, by the mobile terminal, the to-be-performed operation in a case that a current touch location of the touch operation is inside a control cancellation area displayed on the touchscreen and current touch strength of the touch operation is greater than or equal to a preset threshold. In the foregoing method, it is determined, according to a touch location and current touch strength, whether to cancel a to-be-performed operation. Therefore, the accuracy of determining whether to cancel a to-be-performed operation can be effectively improved and the misoperation rate can be reduced.

What is claimed is:

1. A touchscreen-based control method performed at a mobile terminal having one or more processors and memory storing a plurality of programs to be executed by the one or more processors, comprising:
   detecting, by the mobile terminal, a touch operation on a touch button on a touchscreen of the mobile terminal;
   determining, by the mobile terminal, a to-be-performed operation corresponding to the touch button on the touchscreen of the mobile terminal in response to the touch operation on the touch button;
   displaying, by the mobile terminal, a control cancellation area on the touchscreen;
   determining a current touch location and a current touch strength of the touch operation;
   canceling, by the mobile terminal, the to-be-performed operation in accordance with a determination that the current touch location of the touch operation is inside the control cancellation area displayed on the touchscreen and the current touch strength of the touch operation is greater than or equal to a preset threshold; and
   canceling, by the mobile terminal, the display of the control cancellation area on the touchscreen.

2. The control method according to claim 1, further comprising:
   performing, by the mobile terminal, the to-be-performed operation in accordance with a determination that a location at which the touch operation is released is outside the control cancellation area.

3. The control method according to claim 1, further comprising:
   performing, by the mobile terminal, the to-be-performed operation in accordance with a determination that a location at which the touch operation is released is inside the control cancellation area and the touch strength of the touch operation is less than the preset threshold.

4. The control method according to claim 1, wherein the displaying, by the mobile terminal, the control cancellation area comprises:
   displaying, by the mobile terminal, the control cancellation area at a specified location on the touchscreen in accordance with a determination that the current touch location of the touch operation is inside a displayed auxiliary control area on the touchscreen, wherein the auxiliary control area is an area formed with the touch button at its center;
   determining, by the mobile terminal, a location at a preset distance from the touch button as a target location on a trajectory of a connecting line between the touch button and the current touch location of the touch operation in accordance with a determination that the current touch location of the touch operation is at an edge of the auxiliary control area within a range in a specified direction; and displaying, by the mobile terminal, the control cancellation area at the target location in accordance with a determination that the current touch location of the touch operation is outside the auxiliary control area.

5. The control method according to claim 1, further comprising:

displaying, by the mobile terminal, a strength indication identifier of the current touch strength of the touch operation on the touchscreen in accordance with a determination that the current touch location of the touch operation is inside the control cancellation area displayed on the touchscreen.

6. The control method according to claim 5, further comprising:

after canceling the to-be-performed operation, removing, by the mobile terminal, the strength indication identifier from the touchscreen in accordance with a determination that the current touch location of the touch operation is outside the control cancellation area in response to the display of the strength indication identifier.

7. The control method according to claim 5, wherein the strength indication identifier is a strength presentation area, the strength presentation area being a regular shape with the current touch location at its center, and a size of the strength presentation area being directly proportional to the touch strength.

8. The control method according to claim 1, wherein the control cancellation area is an area formed by splicing a plurality of specified geometric shapes.

9. A mobile terminal comprising one or more processors, memory coupled to the one or more processors and a plurality of programs stored in the memory that, when executed by the one or more processors, cause the mobile terminal to perform a plurality of operations comprising:

detecting, by the mobile terminal, a touch operation on a touch button on a touchscreen of the mobile terminal;

determining, by the mobile terminal, a to-be-performed operation corresponding to the touch button on the touchscreen of the mobile terminal in response to the touch operation on the touch button;

displaying, by the mobile terminal, a control cancellation area on the touchscreen;

determining a current touch location and a current touch strength of the touch operation;

canceling, by the mobile terminal, the to-be-performed operation in accordance with a determination that the current touch location of the touch operation is inside the control cancellation area displayed on the touchscreen and the current touch strength of the touch operation is greater than or equal to a preset threshold; and canceling, by the mobile terminal, the display of the control cancellation area on the touchscreen.

10. The mobile terminal according to claim 9, wherein the plurality of operations further comprise:

performing, by the mobile terminal, the to-be-performed operation in accordance with a determination that a location at which the touch operation is released is outside the control cancellation area.

11. The mobile terminal according to claim 9, wherein the plurality of operations further comprise:

performing, by the mobile terminal, the to-be-performed operation in accordance with a determination that a location at which the touch operation is released is inside the control cancellation area and the touch strength of the touch operation is less than the preset threshold.

12. The mobile terminal according to claim 9, wherein the displaying, by the mobile terminal, the control cancellation area comprises:

displaying, by the mobile terminal, the control cancellation area at a specified location on the touchscreen in accordance with a determination that the current touch location of the touch operation is inside a displayed auxiliary control area on the touchscreen, wherein the auxiliary control area is an area formed with the touch button at its center;

determining, by the mobile terminal, a location at a preset distance from the touch button as a target location on a trajectory of a connecting line between the touch button and the current touch location of the touch operation in accordance with a determination that the current touch location of the touch operation is at an edge of the auxiliary control area within a range in a specified direction; and displaying, by the mobile terminal, the control cancellation area at the target location in accordance with a determination that the current touch location of the touch operation is outside the auxiliary control area.

13. The mobile terminal according to claim 9, wherein the plurality of operations further comprise:

displaying, by the mobile terminal, a strength indication identifier of the current touch strength of the touch operation on the touchscreen in accordance with a determination that the current touch location of the touch operation is inside the control cancellation area displayed on the touchscreen.

14. The mobile terminal according to claim 13, wherein the plurality of operations further comprise:

after canceling the to-be-performed operation, removing, by the mobile terminal, the strength indication identifier from the touchscreen in accordance with a determination that the current touch location of the touch operation is outside the control cancellation area in response to the display of the strength indication identifier.

15. A non-transitory computer readable storage medium storing a plurality of machine readable instructions in connection with a mobile terminal having one or more processors, wherein the plurality of machine readable instructions, when executed by the one or more processors, cause the mobile terminal to perform a plurality of operations including:

detecting, by the mobile terminal, a touch operation on a touch button on a touchscreen of the mobile terminal;

determining, by the mobile terminal, a to-be-performed operation corresponding to the touch button on the touchscreen of the mobile terminal in response to the touch operation on the touch button;

displaying, by the mobile terminal, a control cancellation area on the touchscreen;

determining a current touch location and a current touch strength of the touch operation;

canceling, by the mobile terminal, the to-be-performed operation in accordance with a determination that the current touch location of the touch operation is inside the control cancellation area displayed on the touchscreen and the current touch strength of the touch operation is greater than or equal to a preset threshold; and canceling, by the mobile terminal, the display of the control cancellation area on the touchscreen.

16. The non-transitory computer readable storage medium according to claim 15, wherein the plurality of operations further comprise:

performing, by the mobile terminal, the to-be-performed operation in accordance with a determination that a location at which the touch operation is released is outside the control cancellation area.

17. The non-transitory computer readable storage medium according to claim 15, wherein the plurality of operations further comprise:

performing, by the mobile terminal, the to-be-performed operation in accordance with a determination that a location at which the touch operation is released is inside the control cancellation area and the touch strength of the touch operation is less than the preset threshold.

* * * * *